United States Patent
Numamoto et al.

(10) Patent No.: US 11,897,025 B2
(45) Date of Patent: Feb. 13, 2024

(54) FORGING DEVICE AND FORGING METHOD FOR OUTER JOINT MEMBER OF CONSTANT-VELOCITY UNIVERSAL JOINT

(71) Applicant: NTN Corporation, Osaka (JP)

(72) Inventors: Jun Numamoto, Shizuoka (JP); Takuya Fujita, Shizuoka (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 17/944,719

(22) Filed: Sep. 14, 2022

(65) Prior Publication Data

US 2023/0013212 A1 Jan. 19, 2023

Related U.S. Application Data

(62) Division of application No. 16/957,469, filed as application No. PCT/JP2018/047765 on Dec. 26, 2018, now Pat. No. 11,478,845.

(30) Foreign Application Priority Data

Jan. 9, 2018 (JP) .................. 2018-001253

(51) Int. Cl.
| | |
|---|---|
| *B21K 1/76* | (2006.01) |
| *B21J 5/12* | (2006.01) |
| *F16D 3/223* | (2011.01) |
| *B21J 5/02* | (2006.01) |
| *B41J 9/02* | (2006.01) |
| *B21J 13/10* | (2006.01) |

(Continued)

(52) U.S. Cl.
CPC ............ *B21K 1/765* (2013.01); *B21J 5/12* (2013.01); *F16D 3/223* (2013.01); *B21J 5/02* (2013.01);

(Continued)

(58) Field of Classification Search
CPC ... B21J 13/14; B21J 13/08; B21J 13/10; B21J 5/02; B21J 5/12; B21J 9/12; B21J 13/02;

(Continued)

(56) References Cited

U.S. PATENT DOCUMENTS

| 5,186,082 A | 2/1993 | Kuramitsu |
| 5,765,430 A | 6/1998 | Iihara |

(Continued)

FOREIGN PATENT DOCUMENTS

| EP | 3 417 957 | 12/2018 |
| JP | 2017-144452 | 8/2017 |

OTHER PUBLICATIONS

International Search Report dated Mar. 26, 2019 in International (PCT) Application No. PCT/JP2018/047765.

(Continued)

*Primary Examiner* — Sarang Afzali
*Assistant Examiner* — Darrell C Ford
(74) *Attorney, Agent, or Firm* — Wenderoth, Lind & Ponack, L.L.P.

(57) ABSTRACT

A forging apparatus includes an ironing mechanism and a phase alignment mechanism. The ironing mechanism includes: a punch set, which is fitted into a cylindrical portion of a pre-processing material to be formed into the outer joint member, and is radially expandable and contractible, the cylindrical portion having grooves formed in an inner peripheral surface thereof; and a die having a hole into which the cylindrical portion is press-fitted. The phase alignment mechanism is configured to align phases of the grooves in the inner peripheral surface of the pre-processing material and phases of track groove portion forming surfaces of the punch set with each other before the pre-processing material is fitted to the punch set.

7 Claims, 29 Drawing Sheets

(51) Int. Cl.
  *B21J 13/02* (2006.01)
  *B21J 9/12* (2006.01)
  *B21J 13/08* (2006.01)
  *B21J 13/14* (2006.01)
  *B21J 9/02* (2006.01)

(52) U.S. Cl.
  CPC .. *B21J 9/02* (2013.01); *B21J 9/12* (2013.01);
       *B21J 13/02* (2013.01); *B21J 13/08* (2013.01);
       *B21J 13/10* (2013.01); *B21J 13/14* (2013.01);
                             *F16D 2003/22309* (2013.01)

(58) Field of Classification Search
  CPC .. F16D 3/20; F16D 2003/22309; F16D 3/223;
                             B21K 1/765
  See application file for complete search history.

(56) References Cited

U.S. PATENT DOCUMENTS

| | | | |
|---|---|---|---|
| 6,406,374 B1* | 6/2002 | Kanamaru | B21K 1/765 |
| | | | 464/146 |
| 2001/0011469 A1* | 8/2001 | Nagao | B21J 13/03 |
| | | | 72/353.2 |
| 2014/0007640 A1 | 1/2014 | Endo | |

OTHER PUBLICATIONS

International Preliminary Report on Patentability and Written Opinion of the International Searching Authority dated Jul. 14, 2020 in International (PCT) Application No. PCT/JP2018/047765.

* cited by examiner

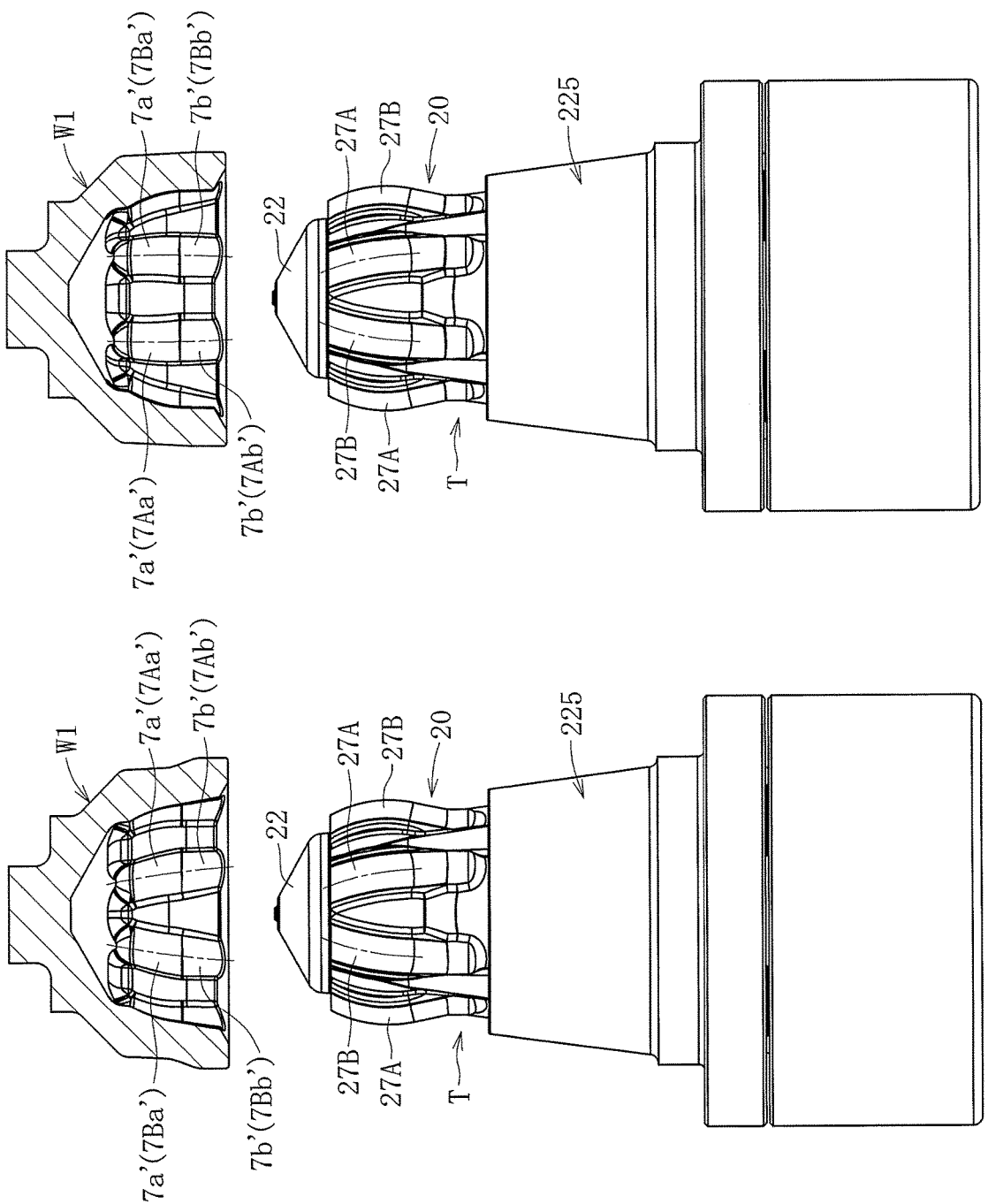

FORGING DEVICE AND FORGING METHOD FOR OUTER JOINT MEMBER OF CONSTANT-VELOCITY UNIVERSAL JOINT

TECHNICAL FIELD

The present invention relates to a forging apparatus and a forging method for an outer joint member of a constant velocity universal joint.

BACKGROUND ART

In general, as illustrated in FIG. 29, an outer joint member of a constant velocity universal joint includes a mouth portion 132 having track grooves 131 extending in an axial direction on an inner peripheral surface thereof, and a shaft portion 133 provided to extend from a bottom wall of the mouth portion 132. In this case, the track grooves 131 of the mouth portion 132 each have an arc shape that is not inclined in a circumferential direction, and a diameter of a track groove bottom at a center portion is set larger than a diameter of a track groove bottom on an opening side of the mouth portion 132. When the outer joint member of the constant velocity universal joint having this structure is to be formed, cold ironing is generally performed.

As illustrated in FIG. 30, a forging apparatus (cold ironing tool) is used for cold ironing. The cold ironing tool mainly includes a punch set 142 and a die 123. The punch set 142 includes punches 120, a punch base 121, and an umbrella punch 122. The punches 120 are capable of advancing and retreating in a direction inclined with respect to an axial direction. The punch base 121 is configured to guide the punches 120. The umbrella punch 122 is configured to retain each of the punches 120 at an axial position of the joint center. The die 123 is configured to press a pre-processing material 140. Track groove forming surfaces 147 are formed on the punches 120.

Before the cold ironing, the pre-processing material 140 is formed by sub-hot forging, and is subjected to surface lubrication treatment (for example, bonderizing treatment). The pre-processing material 140 is placed on the punches 120, and an inner peripheral surface 123a of the die 123 presses an outer peripheral surface of the pre-processing material 140. In this manner, the ironing is performed. After the ironing, the forged product is held by the die 123 due to springback. Along with raising of the die 123, the forged product is raised while drawing the punches 120. As illustrated in FIG. 31A to FIG. 31B, the punches 120 are radially contracted by being guided by the punch base 121 that is inclined with respect to the axial direction, thereby attaining mold releasing of the forged product and the punches 120.

Incidentally, when the outer joint member as illustrated in FIG. 29 is to be formed by forging, the pre-processing material 140 as illustrated in FIG. 30 is used. The pre-processing material 140 has track forming grooves 148 in an inner peripheral surface 141 of a cylindrical portion 140a. Then, when forging (ironing) is to be performed, it is required that phases of the track forming grooves 148 of the pre-processing material 140 and phases of the track groove forming surfaces 147 of the punches 120 be aligned with each other.

In this case, the phases can be aligned with each other with use of a positioning mechanism as illustrated in FIG. 32. The positioning mechanism includes a plate 151, a pair of phase alignment pins 153 and 153, a pressing member (spring member) 154, and a shaft 155. The plate 151 is configured to support the pre-processing material 140. The pair of phase alignment pins 153 and 153 are provided upright from a pin holder 152. The pressing member (spring member) 154 is configured to raise the pin holder 152 and the phase alignment pins 153 and 153 through elastic pressing. The shaft 155 is configured to rotationally drive. Further, the phase alignment pins 153 and 153 are inserted through a head 156 provided at a distal end portion of the shaft 155. Therefore, the head 156 rotates along with rotation of the shaft 155, and the phase alignment pins 153 and 153 rotate about an axial center of the shaft. The pressing member (spring member) 154 is suppressed in an urging force thereof by a stopper mechanism (for example, a cylinder mechanism) (not shown).

Next, a positioning method for the pre-processing material 140 with use of the positioning mechanism illustrated in FIG. 32 is described. First, the positioning mechanism is brought into an initial state. The initial state is a state in which the urging force of the pressing member (spring member) 154 is suppressed by the stopper mechanism, and the pair of phase alignment pins 153 and 153 provided upright from the pin holder 152 are set so that distal ends thereof are located below the upper surface of the head 156.

Then, the pre-processing material 140 is moved and is held at a position concentric with the head 156. In this state, an opening end surface 140a1 of the cylindrical portion 140a of the pre-processing material 140 is placed on the plate 151. In this state, the urging force of the pressing member (spring member) 154 is released, and the pin holder 152 and the phase alignment pins 153 and 153 are raised. In this case, when phases of the raised phase alignment pins 153 and 153 match with phases of the grooves 148 and 148 of the pre-processing material 140, the phase alignment pins 153 and 153 can be fitted into (inserted into) the corresponding grooves 148 and 148 of the pre-processing material 140 as illustrated in FIG. 32.

In contrast, when the phases of the phase alignment pins 153 and 153 and the phases of the grooves 148 and 148 of the pre-processing material 140 do not match with each other, the phase alignment pins 153 and 153 cannot be fitted into (inserted into) the corresponding grooves 148 and 148. Thus, the shaft 155 is rotated so that the phases of the phase alignment pins 153 and 153 and the phases of the grooves 148 and 148 of the pre-processing material 140 match with each other. With this, as illustrated in FIG. 32, the phase alignment pins 153 and 153 can be fitted into (inserted into) the grooves 148 and 148 of the pre-processing material 140.

After that, in the fitting state of the pins 153 and 153, the pre-processing material 140 is rotated through rotation of the shaft 155 and is stopped at a position at which the phases of the pre-processing material 140 are aligned with phases of the punches 120. In this state, as illustrated in FIG. 30, the punch set 142 can be fitted into the cylindrical portion 140a of the pre-processing material 140, and the cylindrical portion 140a can be press-fitted into the inner peripheral surface 123a of the die 123, and be subjected to ironing.

Incidentally, the outer joint member of the constant velocity universal joint has the following features as illustrated in FIG. 33. Track grooves 131A and 131B of the outer joint member are grooves having an arc shape inclined with respect to an axial direction of a radially inner surface (inner peripheral surface) of the mouth portion 132. Inclination directions of the track grooves 131A and 131B adjacent to each other in the circumferential direction are set to be mutually opposite to each other, and a diameter of a track groove bottom at a center portion is set larger than a diameter of a track groove bottom on an opening side of the mouth portion 132.

When such an outer joint member 132 is to be formed, the pre-processing material 140 as illustrated in FIG. 34A and FIG. 34B as described in Patent Literature 1 has hitherto been used. In this case, the function and effect that "in the sub-hot forging for the pre-processing material, through use of the integral punch, increase in forging cost can be suppressed, and the accuracy of the track grooves can be enhanced" is obtained. As illustrated in FIG. 34A and FIG. 34B, the pre-processing material 140 in this case has arc-shaped track groove surfaces 148Aa and 148Ba having a substantially finished shape and being formed in a substantially half part in an axial direction on a far side so as to be inclined in the circumferential direction, and linear track groove surfaces 148Ab and 148Bb having a preliminary shape and being formed in a substantially half part in the axial direction on an opening side so as to be prevented from being inclined in the circumferential direction. In such a case, groove intervals at the opening of the pre-processing material 140 are set to be equal.

In this case, the punch set 142 as illustrated in FIG. 34A and FIG. 34B is used. The punch set 142 includes at least a plurality of punches 145, a punch base 146 configured to guide the punches 145 so as to be enable advancing and retreating, and an umbrella punch 143. Each of the punches 145 has a pair of track groove portion forming surfaces 147A and 147B for forming adjacent track grooves 148A and 148B.

CITATION LIST

Patent Literature 1: JP 2017-144452 A

SUMMARY OF INVENTION

Technical Problem

FIG. 34A is an illustration of a case in which phases of the grooves 148A (148Aa and 148Ab) and 148B (148Ba and 148Bb) of the pre-processing material 140 and phases of the track groove portion forming surfaces 147A and 147B of the punches 145 are aligned with each other. FIG. 34B is an illustration of a case in which the phases of the grooves 148 of the pre-processing material 140 and the phases of the track groove portion forming surfaces 147 of the punches 145 are not aligned with each other. However, in the pre-processing material 140 illustrated in FIG. 34A and FIG. 34B, the groove intervals at the opening are set to be equal. Therefore, even when the phases of the grooves 148A (148Aa and 148Ab) and 148B (148Ba and 148Bb) of the pre-processing material 140 and the phases of the track groove portion forming surfaces 147A and 147B of the punches 145 are not aligned with each other, the the phase alignment pins 153 and 153 illustrated in FIG. 32 can be fitted.

Therefore, even when the pre-processing material 140 is positioned with the positioning mechanism as illustrated in FIG. 32, the phases of the grooves 148A and 148A of the pre-processing material 140 and the phases of the track groove portion forming surfaces 147A and 147A of the punches 145 are not aligned with each other in some cases. It is not possible to stably form the outer joint member 132 in which the track grooves 131A and 131B each have an arc shape inclined in the circumferential direction, and the diameter of the track groove bottom at the center portion is set larger than the diameter of the track groove bottom on the opening side as illustrated in FIG. 33.

The present invention has been made in view of the above-mentioned problem, and provides an forging apparatus and a forging method for an outer joint member, which enable stable formation of an outer joint member in which track grooves each have an arc shape inclined in a circumferential direction, and a diameter of a track groove bottom at a center portion is set larger than a diameter of a track groove bottom on an opening side, and enable use of an existing ironing apparatus as it is.

Solution to Problem

According to one embodiment of the present invention, there is provided a forging apparatus for an outer joint member of a constant velocity universal joint, the constant velocity universal joint comprising: an outer joint member having a spherical inner peripheral surface in which a plurality of track grooves are formed; an inner joint member having a spherical outer peripheral surface in which a plurality of track grooves are formed so as to be paired with the track grooves of the outer joint member; a plurality of balls, which are interposed between the track grooves of the outer joint member and the track grooves of the inner joint member, and are configured to transmit torque; and a cage, which is interposed between the spherical inner peripheral surface of the outer joint member and the spherical outer peripheral surface of the inner joint member, and is configured to hold the balls, the track grooves of the outer joint member and the track grooves of the inner joint member each having an arc-shaped ball raceway center line having a curvature center that is prevented from being offset in an axial direction with respect to a joint center, a plane including the ball raceway center line and the joint center being inclined in a circumferential direction with respect to a joint axial line, each of the track grooves of the outer joint member and each of the track grooves of the inner joint member, which are paired with each other, being inclined in mutually opposite directions, the forging apparatus comprising: an ironing mechanism comprising: a punch set, which is fitted into a cylindrical portion of a pre-processing material to be formed into the outer joint member, and is radially expandable and contractible, the cylindrical portion having grooves formed in an inner peripheral surface thereof; and a die having a hole into which the cylindrical portion is press-fitted; and a phase alignment mechanism configured to align phases of the grooves in the inner peripheral surface of the pre-processing material and phases of track groove portion forming surfaces of the punch set with each other before the pre-processing material is fitted to the punch set, the phase alignment mechanism comprising: a phase alignment jig comprising a pair of convex portions, which are to be fitted into grooves of the pre-processing material which are adjacent to each other in the circumferential direction under a state in which the phases of the grooves in the inner peripheral surface of the pre-processing material and the phases of the track groove portion forming surfaces of the punch set are aligned with each other, and are restricted from being fitted thereto under a state in which the phases of the grooves in the inner peripheral surface of the pre-processing material and the phases of the track groove portion forming surfaces of the punch set are not aligned with each other; and a rotary mechanism configured to rotate the pre-processing material aligned in the phases by the phase alignment jig about an axial center of the pre-processing material so as to align the phases of the pre-processing material with the phases of the track groove portion forming surfaces of the punch set.

With the forging apparatus for an outer joint member of a constant velocity universal joint according to the present invention, before the pre-processing material is fitted to the punch set, the phases of the grooves in the inner peripheral surface of the pre-processing material and the phases of the track groove portion forming surfaces of the punch set can be aligned with each other by the phase alignment mechanism. Thus, in the ironing mechanism, under the state in which the phases of the grooves of the pre-processing material and the phases of the track groove portion forming surfaces of the punch set are aligned with each other, the punch set can be fitted into the cylindrical portion. Further, the ironing mechanism comprises the punch set that is fitted into the cylindrical portion and is radially expandable and contractible, and the die having the hole into which the cylindrical portion is press-fitted. Accordingly, an existing ironing mechanism (forging apparatus) can be used as it is.

Further, it is preferred that, in an inlet portion of the inner peripheral surface of the cylindrical portion, portions of the pre-processing material each between the grooves adjacent to each other in the circumferential direction be thin portions or thick portions, and the thin portions and the thick portions be alternately arranged along the circumferential direction, and that the phase alignment mechanism comprise a phase alignment jig comprising: a pair of convex portions to be fitted along the axial direction to the grooves of the pre-processing material which are adjacent to each other in the circumferential direction; and a coupling portion, which is formed between the convex portions, is allowed to be internally fitted to corresponding one of the thin portions of the pre-processing material along the axial direction, and is prevented from being internally fitted to corresponding one of the thick portions of the pre-processing material along the axial direction.

With such setting, under the state in which the coupling portion of the phase alignment jig is fitted to the pre-processing material, the phases of the grooves of the pre-processing material can be set to desired phases. Therefore, the phases of the grooves of the pre-processing material and the phases of the track groove portion forming surfaces of the punch set can be stably aligned with each other through rotation of the pre-processing material by the rotary mechanism.

It is preferred that the phase alignment jig of the phase alignment mechanism comprise at least two phase alignment jigs arranged opposite to each other at 180° with respect to the axial center. With use of the two phase alignment jigs as described above, phase alignment is stably performed.

The punch set may comprise: at least a plurality of punches; and a punch base configured to guide the punches so as to enable advancing and retreating, and each of the punches may have a pair of forming surfaces for forming the adjacent track grooves.

The punch set may comprise an umbrella punch in addition to the punches and the punch base.

The punches and the punch base may be received and guided into a punch holder, and a length of an advancing stroke of the punches may be larger than a length of an advancing stroke of the punch base.

The inner peripheral surface of the cylindrical portion of the pre-processing material may have: an arc-shaped track groove surface having a substantially finished shape and being formed in a substantially half part in an axial direction on a far side so as to be inclined in the circumferential direction; and a linear track groove surface having a preliminary shape and being formed in a substantially half part in the axial direction on an opening side so as to be prevented from being inclined in the circumferential direction.

An outer peripheral surface of the cylindrical portion of the pre-processing material may have a protruding portion that partially projects.

According to one embodiment of the present invention, there is provided a forging method for an outer joint member of a constant velocity universal joint, the constant velocity universal joint comprising: an outer joint member having a spherical inner peripheral surface in which a plurality of track grooves are formed; an inner joint member having a spherical outer peripheral surface in which a plurality of track grooves are formed so as to be paired with the track grooves of the outer joint member; a plurality of balls, which are interposed between the track grooves of the outer joint member and the track grooves of the inner joint member, and are configured to transmit torque; and a cage, which is interposed between the spherical inner peripheral surface of the outer joint member and the spherical outer peripheral surface of the inner joint member, and is configured to hold the balls, the track grooves of the outer joint member and the track grooves of the inner joint member each having an arc-shaped ball raceway center line having a curvature center that is prevented from being offset in an axial direction with respect to a joint center, a plane including the ball raceway center line and the joint center being inclined in a circumferential direction with respect to a joint axial line, each of the track grooves of the outer joint member and each of the track grooves of the inner joint member, which are paired with each other, being inclined in mutually opposite directions, the method comprising: aligning, before the pre-processing material is fitted into a punch set, phases of grooves formed in an inner peripheral surface of a cylindrical portion of the pre-processing material and phases of track groove portion forming surfaces of the punch set with each other with use of a phase alignment mechanism; and performing ironing by fitting the punch set that is radially expandable and contractible into the cylindrical portion of the pre-processing material of the outer joint member comprising the cylindrical portion under a state in which the phases are aligned with each other, and press-fitting the cylindrical portion into a hole of a die, and the phase alignment mechanism comprising a phase alignment jig comprising a pair of convex portions, which are to be fitted into two grooves of the pre-processing material which are adjacent to each other in the circumferential direction under a state in which the phases of the grooves in the inner peripheral surface of the pre-processing material and the phases of the track groove portion forming surfaces of the punch set are aligned with each other, and are restricted from being fitted thereto under a state in which the phases of the grooves in the inner peripheral surface of the pre-processing material and the phases of the track groove portion forming surfaces of the punch set are not aligned with each other.

With the forging method for an outer joint member of a constant velocity universal joint according to the present invention, under the state in which the phases of the grooves of the pre-processing material (pre-processing material in which the grooves each have an arc shape that is inclined in the circumferential direction, and a diameter of a track groove bottom at the center portion is set larger than a diameter of a track groove bottom on an opening side) and the phases of the track groove portion forming surfaces of the punch set are aligned with each other, the punch set can be fitted into the cylindrical portion. Therefore, under the state in which the phases of the grooves and the phases of the track groove portion forming surfaces of the punch set are aligned with each other, the cylindrical portion of the pre-processing material can be press-fitted into the hole of the die and be subjected to ironing.

It is preferred that, in an inlet portion of the inner peripheral surface of the cylindrical portion, portions of the pre-processing material each between the grooves adjacent to each other in the circumferential direction be thin portions or thick portions, and the thin portions and the thick portions be alternately arranged along the circumferential direction, and that the phase alignment mechanism comprise a phase alignment jig comprising: a pair of convex portions to be fitted along the axial direction to the grooves of the pre-processing material which are adjacent to each other in the circumferential direction and a coupling portion, which is formed between the convex portions, is allowed to be internally fitted to corresponding one of the thin portions of the pre-processing material along the axial direction, and is prevented from being internally fitted to corresponding one of the thick portions of the pre-processing material along the axial direction.

With such setting, under the state in which the coupling portion of the phase alignment jig is fitted to the pre-processing material, the phases of the grooves of the pre-processing material can be set to desired phases (groove portion forming surfaces of the punch set).

It is preferred that, under a state in which the pair of convex portions of the phase alignment jig are fitted to a pair of grooves of the pre-processing material, and a radially outer surface of the phase alignment jig is internally fitted to the corresponding one of the thin portions, the pre-processing material is stopped at a predetermined phase position through rotation of the phase alignment jig, and ironing with the punch set and the die is performed. With such setting, the phases of the grooves of the pre-processing material and the phases of the track groove portion forming surfaces of the punch set can be stably aligned with each other through rotation of the pre-processing material.

In the ironing, the cylindrical portion of the pre-processing material can be press-fitted into the hole of the die from an opening portion side of the cylindrical portion.

Advantageous Effects of Invention

According to the present invention, under the state in which the phases of the pre-processing material (pre-processing material in which the grooves each have an arc shape that is inclined in the circumferential direction, and the diameter of the track groove bottom at the center portion is set larger than the diameter of the track groove bottom on the opening side) and the phases of the track groove portion forming surfaces of the punch set are aligned with each other, the cylindrical portion of the pre-processing material can be press-fitted into the hole of the die and be subjected to ironing. Accordingly, forming failure, die breakage, and the like can be prevented. In addition, as a molding device (ironing mechanism), an existing apparatus can be used as it is, thereby being capable of attaining cost reduction.

BRIEF DESCRIPTION OF DRAWINGS

FIG. 9A is an illustration of a relationship between the punch set of the ironing mechanism and the pre-processing material, and is a front view of a state in which phases are aligned with each other.

FIG. 9B is an illustration of a relationship between the punch set of the ironing mechanism and the pre-processing material, and is a front view of a state in which the phases are not aligned with each other.

DESCRIPTION OF EMBODIMENTS

Figure 10B:
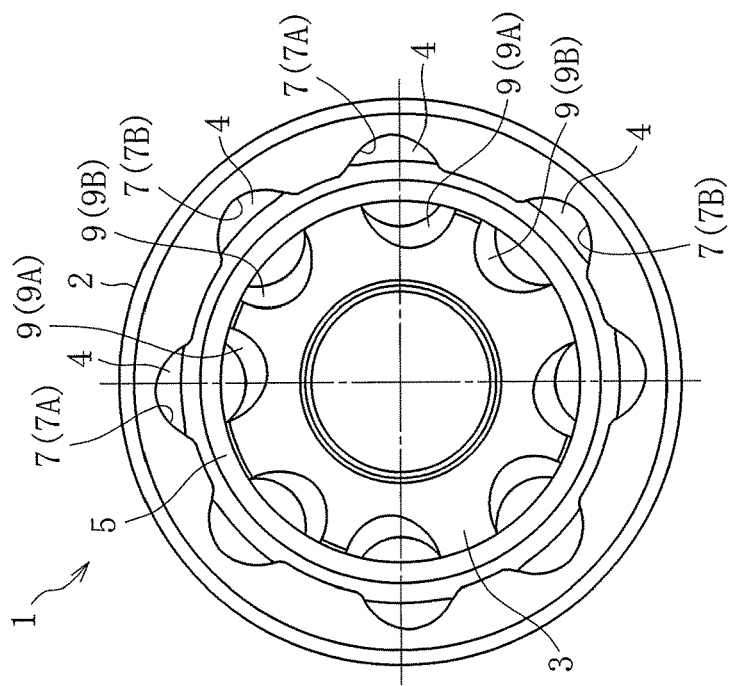
FIG. 10B is a side view of the constant velocity universal joint in which the outer joint member manufactured based on the forging method according to one embodiment of the present invention is incorporated.
Figure 10A:
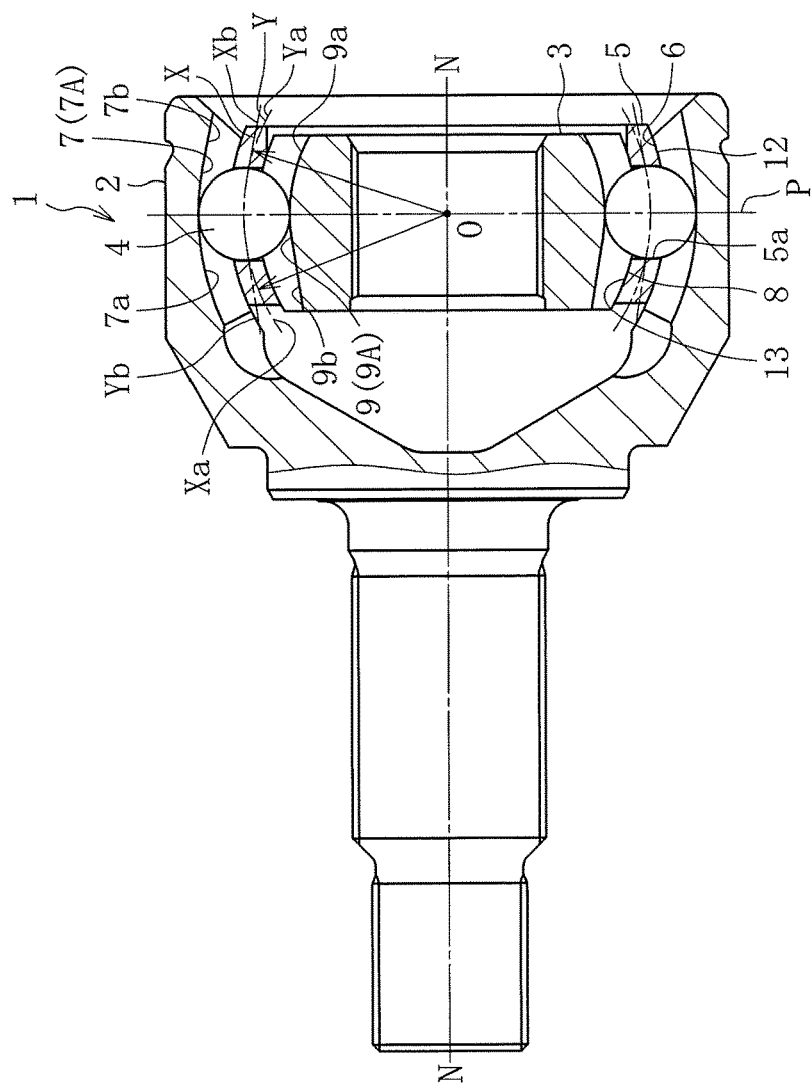
FIG. 10A is a partial longitudinal sectional view of a constant velocity universal joint in which an outer joint member manufactured based on a forging method according to one embodiment of the present invention is incorporated.

In the following, embodiments of the present invention are described with reference to FIG. 1 to FIG. 28. FIG. 10A is a partial longitudinal sectional view of the constant velocity universal joint, and FIG. 10B is a right side view of FIG. 10A. A constant velocity universal joint 1 is a fixed type constant velocity universal joint, and mainly comprises an outer joint member 2, an inner joint member 3, balls 4 configured to transmit torque, and a cage 5. As illustrated in FIG. 10A, FIG. 10B, FIG. 11 and FIGS. 12, eight track grooves 7 of the outer joint member 2 comprise track grooves 7A and 7B that are inclined in a circumferential direction with respect to a joint axial line N-N so that the track grooves 7A and 7B adjacent to each other in the circumferential direction are inclined in directions opposite to each other. Further, eight track grooves 9 of the inner joint member 3 comprise track grooves 9A and 9B that are inclined in the circumferential direction with respect to the joint axial line N-N so that the track grooves 9A and 9B adjacent to each other in the circumferential direction are inclined in directions opposite to each other. Further, a pair of the track grooves 7A and 9A and a pair of the track grooves 7B and 9B of the outer joint member 2 and the inner joint member 3 are inclined in directions opposite to each other (mutually opposite), and the eight balls 4 are arranged in crossing portions of the paired track grooves 7A and 9A and the paired track grooves 7B and 9B of the outer joint member 2 and the inner joint member 3. Detailed description of the track grooves 7 and 9 is given later.

A longitudinal section of the joint is illustrated in FIG. 10A. The term "ball raceway center line" is used herein to accurately describe the form and shape of each track groove extending in the axial direction, such as an inclined state and a curved state of the track groove. The ball raceway center line herein refers to a trajectory of the center of the ball arranged in the track groove at the time of moving along the track groove. Thus, the inclined state of the track groove corresponds to an inclined state of the ball raceway center line, and the arc or linear shape of the track groove corresponds to an arc or linear shape of the ball raceway center line.

As illustrated in FIG. 10A, each track groove 7 of the outer joint member 2 has a ball raceway center line X. The track groove 7 comprises a first track groove portion 7a having an arc-shaped ball raceway center line Xa about a joint center O defined as a curvature center, and a second track groove portion 7b having a linear ball raceway center line Xb. The ball raceway center line Xb of the second track groove portion 7b is smoothly continuous with the ball raceway center line Xa of the first track groove portion 7a as a tangential line. Meanwhile, each track groove 9 of the inner joint member 3 has a ball raceway center line Y. The track groove 9 comprises a first track groove portion 9a having an arc-shaped ball raceway center line Ya about the joint center O defined as a curvature center, and a second track groove portion 9b having a linear ball raceway center line Yb. The ball raceway center line Yb of the second track groove portion 9b is smoothly continuous with the ball raceway center line Ya of the first track groove portion 9a as a tangential line.

The curvature centers of the ball raceway center lines Xa and Ya of the first track groove portions 7a and 9a are arranged on the joint center O, that is, on the joint axial line N-N. As a result, the track groove depths can be set equal to each other and the processing can be facilitated. The track grooves 7 and 9 each have an elliptical shape or a Gothic arch shape in transverse section, and the track grooves 7 and 9 are held in so-called angular contact with each ball 4 at a contact angle (approximately from 30° to 45°). Thus, the ball 4 is held in contact with side surface sides of the track grooves 7 and 9, which are slightly spaced apart from groove bottoms of the track grooves 7 and 9.

Figure 11A:
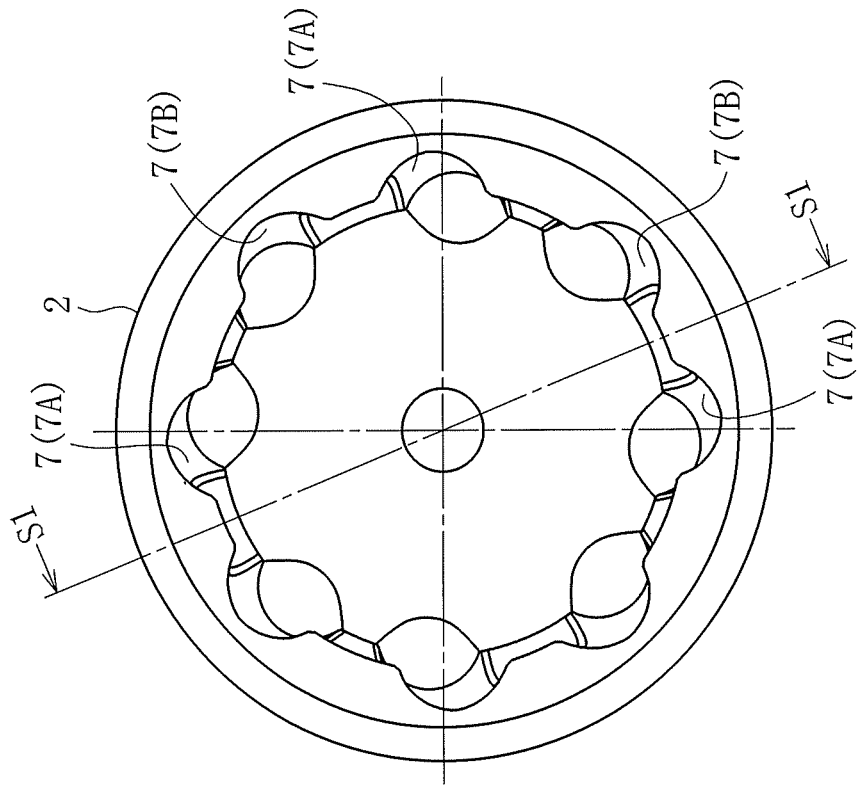
FIG. 11A is a partial longitudinal sectional view of the outer joint member of the constant velocity universal joint.
Figure 11B:
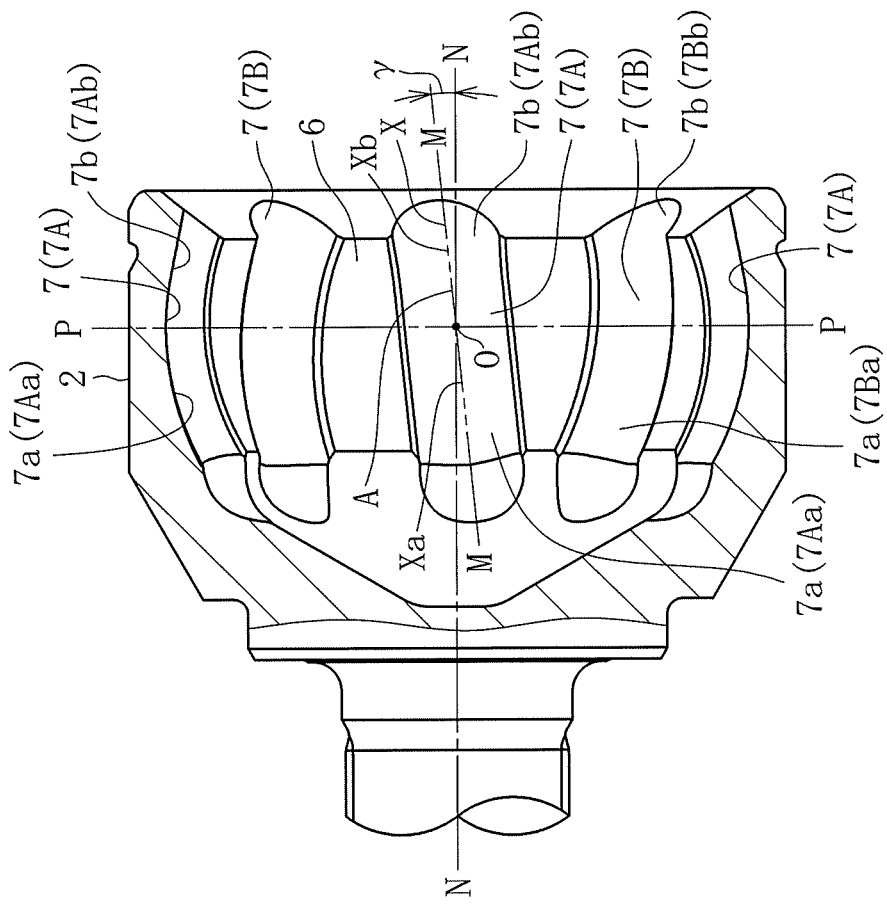
FIG. 11B is a side view of the outer joint member of the constant velocity universal joint.

With reference to FIG. 11A and FIG. 11B, detailed description is given of a state in which the track grooves 7 of the outer joint member 2 are inclined in the circumferential direction with respect to the joint axial line N-N. FIG. 11A is a partial longitudinal sectional view of the outer joint member 2, and FIG. 11B is a right side view of the outer joint member 2. The track grooves 7 of the outer joint member 2 are denoted by the reference symbols 7A and 7B to indicate a difference in inclination direction thereof. As illustrated in FIG. 11A, a plane M including the ball raceway center line X of each track groove 7A and the joint center O is inclined at an angle γ in the circumferential direction with respect to the joint axial line N-N. In addition, in the case of each track groove 7B adjacent to the track groove 7A in the circumferential direction, although illustration is omitted, a plane M including the ball raceway center line X of the track groove 7B and the joint center O is inclined at an angle γ with respect to the joint axial line N-N in an opposite direction to the inclination direction of the track groove 7A. In this embodiment, the entire ball raceway center line X of the track groove 7A, that is, both the ball raceway center line Xa of the first track groove portion 7a and the ball raceway center line Xb of the second track groove portion 7b are formed in the plane M. However, the present invention is not limited thereto, and may be carried out in such a mode that only the ball raceway center line Xa of the first track groove portion 7a is included in the plane M. Therefore, it is only required that the plane M including at least the ball raceway center line Xa of the first track groove portion 7a and the joint center O be inclined in the circumferential direction with respect to the joint axial line N-N and the first track groove portions 7a adjacent to each other in the circumferential direction be inclined in directions opposite to each other.

Now, supplementary description is given of the reference symbols of the track grooves. The track grooves of the outer joint member 2 as a whole are denoted by the reference symbol 7. The first track groove portion is denoted by the reference symbol 7a. The second track groove portion is denoted by the reference symbol 7b. Further, the track grooves distinguished from each other based on the difference in inclination direction are denoted by reference symbols 7A and 7B. First track groove portions of the respective track grooves 7A and 7B are denoted by reference symbols 7Aa and 7Ba. Second track groove portions of the respective track grooves 7A and 7B are denoted by reference symbols 7Ab and 7Bb. The track grooves of the inner joint member 3 described later are denoted by reference symbols in a similar manner.

Figure 12C:
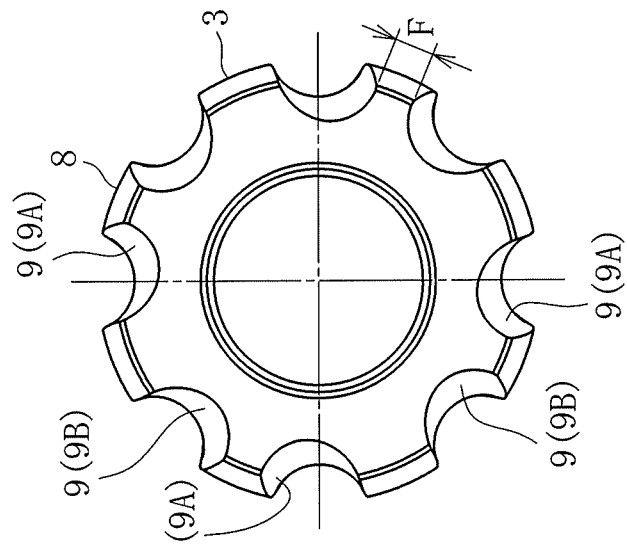
FIG. 12C is a right side view of the inner joint member of the constant velocity universal joint.
Figure 12B:
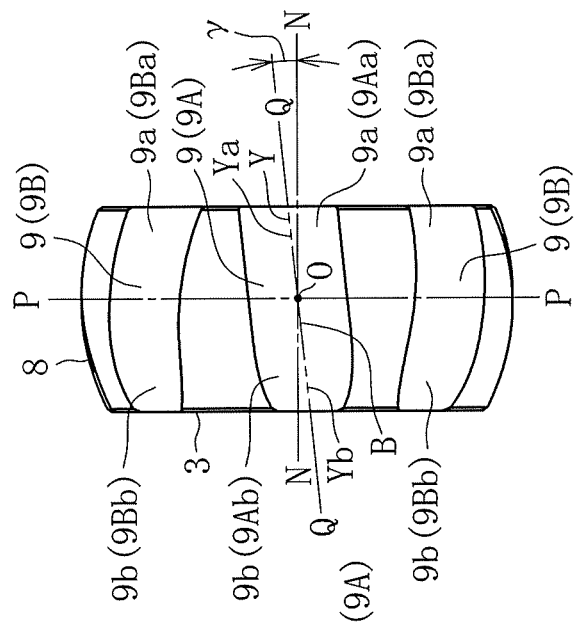
FIG. 12B is an illustration of inner and outer peripheral surfaces of the inner joint member of the constant velocity universal joint.
Figure 12A:
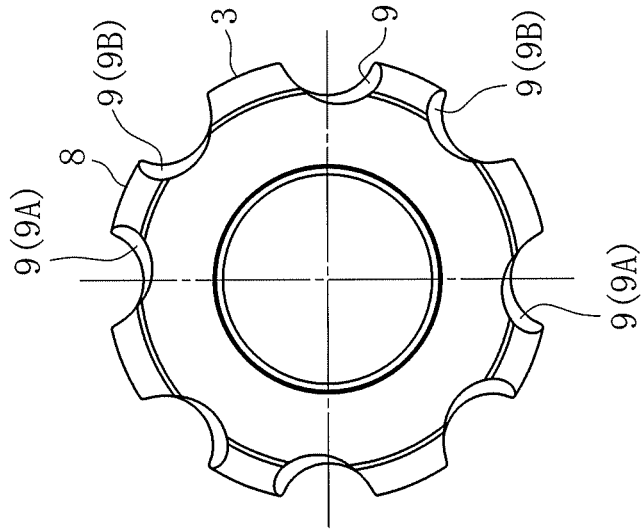
FIG. 12A is a left side view of an inner joint member of the constant velocity universal joint.

Next, with reference to FIG. 12A and FIG. 12B, detailed description is given of a state in which the track grooves 9 of the inner joint member 3 are inclined in the circumferential direction with respect to the joint axial line N-N. FIG. 12B is a view of the outer peripheral surface of the inner joint member 3. FIG. 12A is a left side view of the inner joint member 3. FIG. 12C is a right side view of the inner joint member 3. The track grooves 9 of the inner joint member 3 are denoted by the reference symbols 9A and 9B to indicate a difference in inclination direction thereof. As illustrated in FIG. 13B, a plane Q including the ball raceway center line Y of each track groove 9A and the joint center O is inclined at an angle γ in the circumferential direction with respect to the joint axial line N-N. In addition, in the case of each track groove 9B adjacent to the track groove 9A in the circumferential direction, although illustration is omitted, a plane Q including the ball raceway center line Y of the track groove 9B and the joint center O is inclined at an angle γ with respect to the joint axial line N-N in an opposite direction to the inclination direction of the track groove 9A. It is preferred that the inclination angle γ be set to an angle of from 4° to 12° in consideration of operability of the constant velocity universal joint 1 and a spherical width F between the closest sides of the track grooves of the inner joint member 3. Further, similarly to the outer joint member described above, in this embodiment, the entire ball raceway center line Y of the track groove 9A, that is, both the ball raceway center line Ya of the first track groove portion 9a and the ball raceway center line Yb of the second track groove portion 9b are formed in the plane Q. However, the present invention is not limited thereto, and may be carried out in such a mode that only the ball raceway center line Ya of the first track groove portion 9a is included in the plane Q. Thus, it is only required that the plane Q including at least the ball raceway center line Ya of the first track groove portion 9a and the joint center O be inclined in the circumferential direction with respect to the joint axial line N-N and the first track groove portions 9a adjacent to each other in the circumferential direction be inclined in directions opposite to each other. The ball raceway center line Y of the track groove 9 of the inner joint member 3 is formed so as to be mirror-image symmetrical with the ball raceway center line X of the paired track groove 7 of the outer joint member 2 with respect to a plane P that includes the joint center O at an operating angle of 0° and is perpendicular to the joint axial line N-N.

Figure 13:
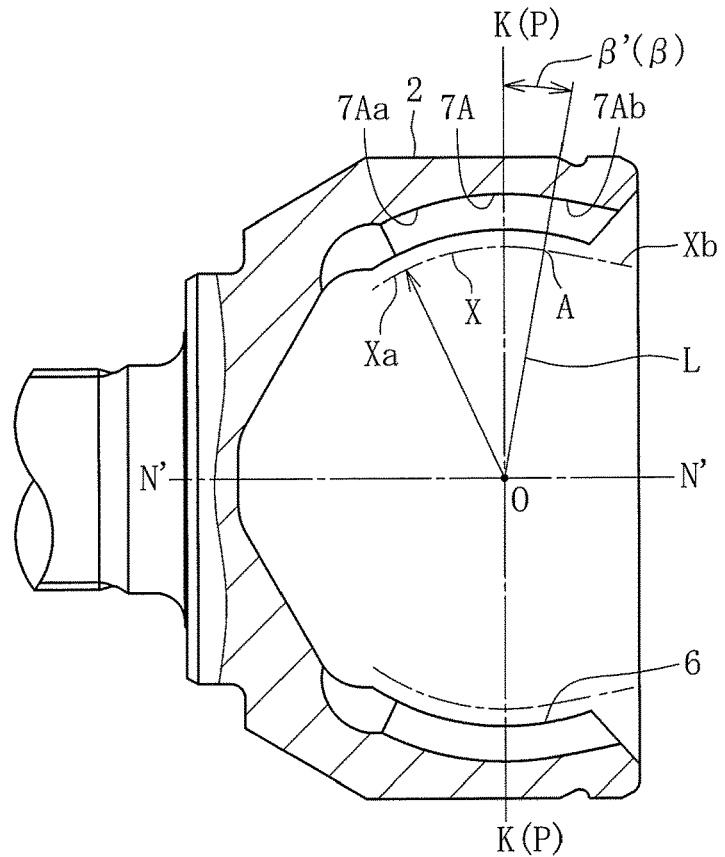
FIG. 13 is a partial longitudinal sectional view for illustrating the details of track grooves of the outer joint member.

With reference to FIG. 13, detailed description is given of the track grooves as viewed in longitudinal section of the outer joint member 2. The partial longitudinal section of FIG. 13 corresponds to a sectional view taken along the above-mentioned plane M of FIG. 11A including the ball raceway center line X of the track groove 7A and the joint center O. Thus, in a strict sense, FIG. 13 is not a longitudinal sectional view taken along the plane including the joint axial line N-N, but is an illustration of a cross section inclined at the angle γ. In FIG. 13, the track groove 7A of the outer joint member 2 is illustrated, and the illustration and description of the track groove 7B are omitted because the inclination direction of the track groove 7B is opposite to that of the track groove 7A and the other configurations of the track groove 7B is the same as those of the track groove 7A. A spherical inner peripheral surface 6 of the outer joint member 2 has the track grooves 7A formed substantially along the axial direction. Each track groove 7A has the ball raceway center line X. The track groove 7A comprises the first track groove portion 7Aa having the arc-shaped ball raceway center line Xa about the joint center O defined as a curvature center (with no offset in the axial direction), and the second track groove portion 7Ab having the linear ball raceway center line Xb. In addition, the linear ball raceway center line Xb of the second track groove portion 7Ab is smoothly connected, as a tangential line, to an end portion A on an opening side of the ball raceway center line Xa of the first track groove portion 7Aa. That is, the end portion A is a connecting point between the first track groove portion 7Aa and the second track groove portion 7Ab. The end portion A is located on the opening side with respect to the joint center O, and hence the linear ball raceway center line Xb of the second track groove portion 7Ab that is connected, as a tangential line, to the end portion A on the opening side of the ball raceway center line Xa of the first track groove portion 7Aa is formed so as to approach the joint axial line N-N (see FIG. 10A) as the distance to the opening side becomes smaller. Thus, it is possible to secure an effective track length at a maximum operating angle, and to suppress excessive increase in wedge angle.

As illustrated in FIG. 13, L represents a straight line connecting the end portion A and the joint center O. A joint axial line N'-N' projected onto the plane M including the ball raceway center line X of the track groove 7A and the joint center O (see FIG. 11A) is inclined at an angle γ with respect to the joint axial line N-N, and an angle formed between a perpendicular line K and the straight line L with respect to the joint center O on the axial line N'-N' is represented by β'. The above-mentioned perpendicular line K is formed in the plane P including the joint center O at the operating angle of 0°. Thus, an angle β formed by the straight line L with respect to the plane P including the joint center O at the operating angle of 0° satisfies a relationship of sin β=sin β'×cos γ.

Figure 14:
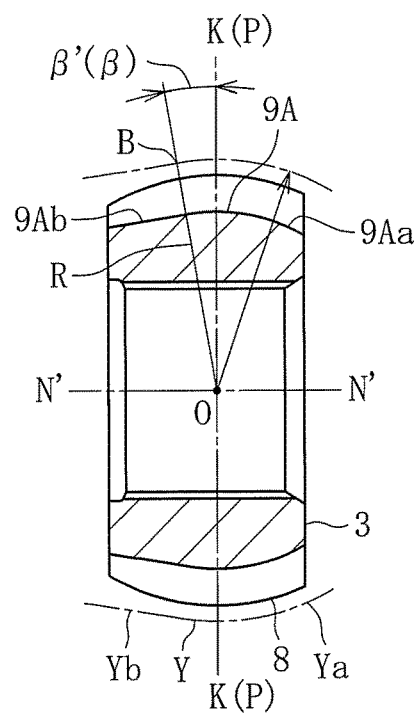
FIG. 14 is a longitudinal sectional view for illustrating the details of track grooves of the inner joint member.

Similarly, with reference to FIG. 14, detailed description is given of the track grooves as viewed in longitudinal section of the inner joint member 3. The partial longitudinal section of FIG. 14 corresponds to a sectional view taken along the above-mentioned plane Q of FIG. 12B including the ball raceway center line Y of the track groove 9A and the joint center O. Thus, similarly to FIG. 13, in a strict sense, FIG. 14 is not a longitudinal sectional view in the plane including the joint axial line N-N, but is an illustration of a cross section inclined at the angle γ. In FIG. 14, the track groove 9A of the inner outer joint member 3 is illustrated, and the illustration and description of the track groove 9B are omitted because the inclination direction of the track groove 9B is opposite to that of the track groove 9A and the other configurations of the track groove 9B is the same as those of the track groove 9A. A spherical outer peripheral surface 8 of the inner joint member 3 has the track grooves 9A formed substantially along the axial direction. Each track groove 9A has the ball raceway center line Y. The track groove 9A comprises the first track groove portion 9Aa having the arc-shaped ball raceway center line Ya about the joint center O defined as a curvature center (with no offset in the axial direction), and the second track groove portion 9Ab having the linear ball raceway center line Yb. In addition, the ball raceway center line Yb of the second track groove portion 9Ab is smoothly connected, as a tangential line, to an end portion B on a far side of the ball raceway center line Ya of the first track groove portion 9Aa. That is, the end portion B is a connecting point between the first track groove portion 9Aa and the second track groove portion 9Ab. The end portion B is located on the far side with respect to the joint center O, and hence the linear ball raceway center line Yb of the second track groove portion 9Ab that is connected, as a tangential line, to the end portion B on the far side of the ball raceway center line Ya of the first track groove portion 9Aa is formed so as to approach the joint axial line N-N (see FIG. 10A) as the distance to the far side becomes smaller. Thus, it is possible to secure an effective track length at a maximum operating angle, and to suppress excessive increase in wedge angle.

As illustrated in FIG. 14, R represents a straight line connecting the end portion B and the joint center O. A joint axial line N'-N' projected onto the plane Q including the ball raceway center line Y of the track groove 9A and the joint center O (see FIG. 12B) is inclined at an angle γ with respect to the joint axial line N-N, and an angle formed between a perpendicular line K and the straight line R with respect to the joint center O on the axial line N'-N' is represented by β'. The above-mentioned perpendicular line K is formed in the plane P including the joint center O at the operating angle of 0°. Thus, an angle β formed by the straight line R with respect to the plane P including the joint center O at the operating angle of 0° satisfies a relationship of sin β=sin β'×cos γ.

Next, description is given of the angle β formed by each of the straight lines L and R with respect to the plane P including the joint center O at the operating angle of 0°. At an operating angle θ, each ball 4 moves by θ/2 with respect to the plane P including the joint center O in the outer joint member 2 and the inner joint member 3. The angle β is determined based on ½ of a frequently used operating angle, and a contact range of the track groove for the ball 4 is determined within a range of the frequently used operating angle. Now, the frequently used operating angle is defined. First, a normal angle of the joint refers to an operating angle to be formed in a fixed type constant velocity universal joint of a front drive shaft of an automobile with one person onboard when the steering of the automobile is switched to a straightforward mode on a horizontal and flat road surface. In general, the normal angle is selected and determined within a range of from 2° to 15° in accordance with design conditions for vehicle types. In addition, the frequently used operating angle refers to an operating angle to be formed in the fixed type constant velocity universal joint of the above-mentioned automobile during, for example, continuous travel on a curved road, instead of a high operating angle to be formed at the time of, for example, right and left turns at a traffic intersection. This operating angle is also determined in accordance with the design conditions for vehicle types. The frequently used operating angle is supposed to be 20° at maximum. Thus, the angle β formed by each of the straight lines L and R with respect to the plane P including the joint center O at the operating angle of 0° is set to an angle of 3° to 10°. The angle R is not limited to the angle of from 3° to 10°, and may be set appropriately in accordance with the design conditions for vehicle types. When the angle β is set to the angle of from 3° to 10°, the fixed type constant velocity universal joint of this embodiment is widely applicable to various vehicle types.

In FIG. 13, due to the above-mentioned angle β, the end portion A of the ball raceway center line Xa of the first track groove portion 7Aa corresponds to a center position of the ball that is moved to the end of the opening side along the axial direction at the frequently used operating angle. Similarly, in FIG. 14 in the case of the inner joint member 3, the end portion B of the ball raceway center line Ya of the first track groove portion 9Aa corresponds to a center position of the ball that is moved to the end of the far side along the axial direction at the frequently used operating angle. With this setting, within the range of the frequently used operating angles, the balls 4 are located between the first track groove portions 7Aa and 9Aa of the outer joint member 2 and the inner joint member 3 and between the first track groove portions 7Ba and 9Ba that are inclined in the opposite directions (see FIG. 11A and FIG. 12B). Therefore, forces in opposite directions are applied from the balls 4 to pocket portions 5a of the cage 5 that are adjacent to each other in the circumferential direction, and hence the cage 5 is stabilized at the position of the joint center O (see FIG. 10A). Thus, a contact force between a spherical outer peripheral surface 12 of the cage 5 and the spherical inner peripheral surface 6 of the outer joint member 2, and a contact force between a spherical inner peripheral surface 13 of the cage 5 and the spherical outer peripheral surface 8 of the inner joint member 3 are suppressed. Accordingly, the joint is smoothly operated under high load and in high speed rotation, and torque loss and heat generation are suppressed. As a result, the durability is enhanced.

In the constant velocity universal joint 1, the balls 4 may be fitted into the pocket portions 5a of the cage 5 with a gap. In this case, it is preferred that the gap be set with a clearance of approximately from 0 μm to 40 μm. When the balls 4 are fitted into the pocket portions 5a with the gap, the balls 4 held in the pocket portions 5a of the cage 5 can smoothly be operated, and hence the torque loss can further be reduced.

Figure 6:
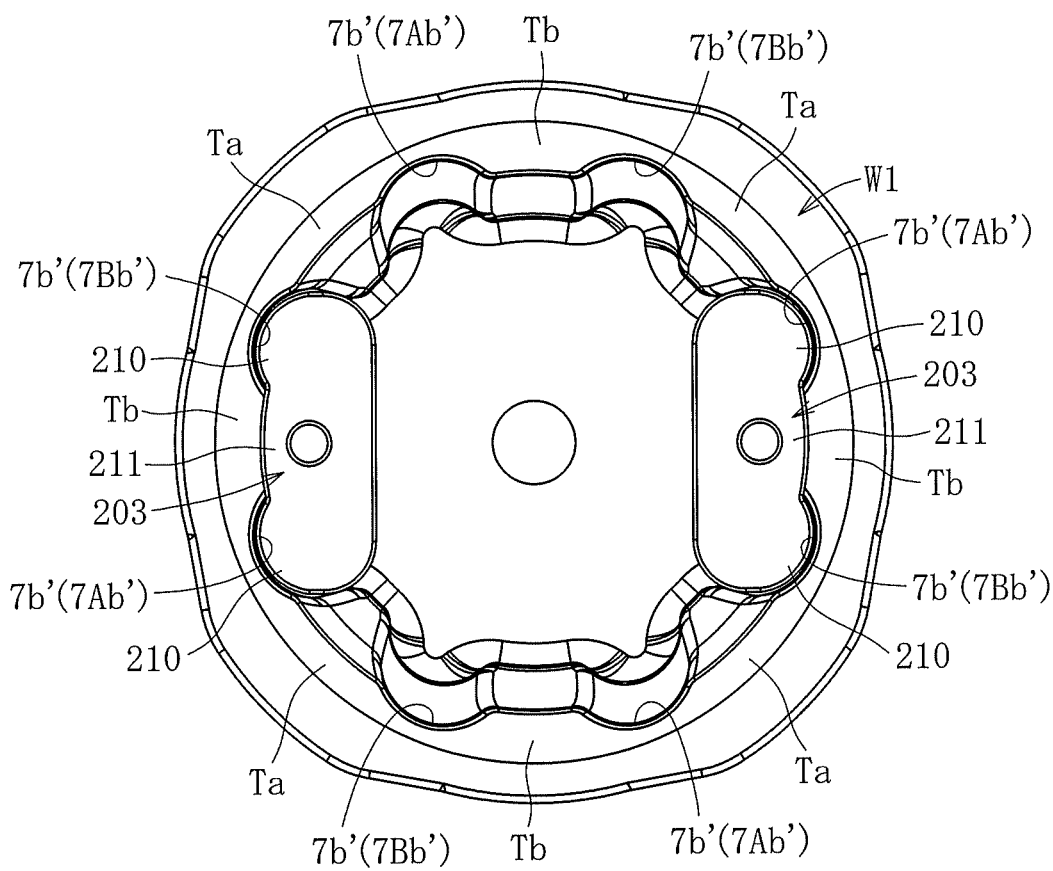
FIG. 6 is an end view of a state in which the phase alignment jigs cannot be fitted to the pre-processing material.
Figure 15:
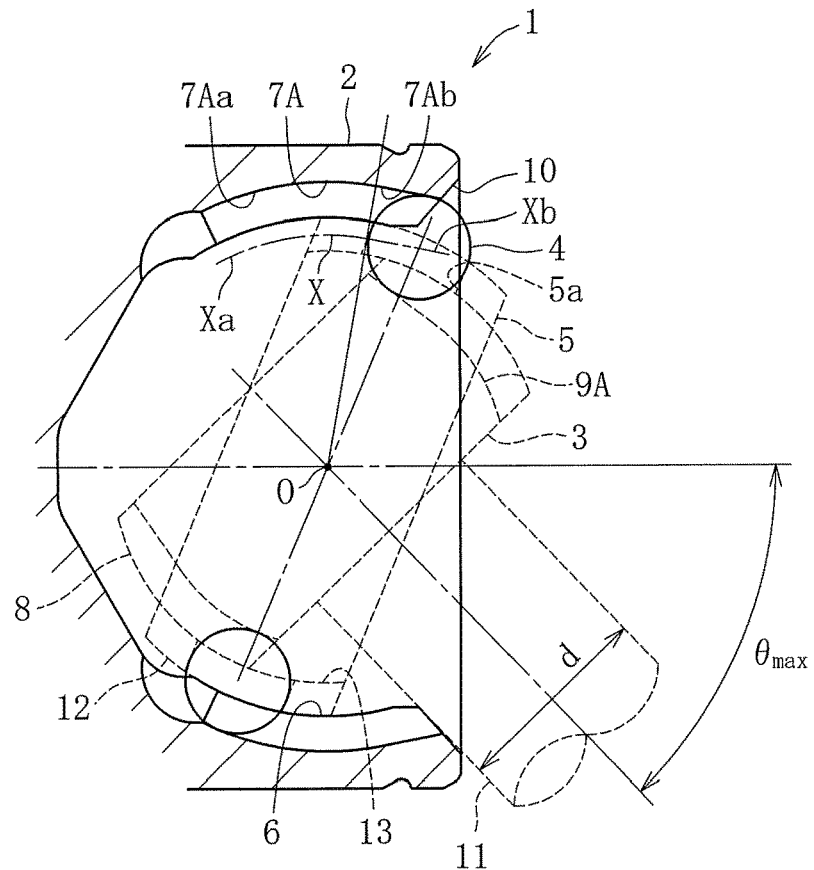
FIG. 15 is a view for illustrating a state in which the constant velocity universal joint of FIG. 10A forms a maximum operating angle.

In FIG. 15, a state in which the constant velocity universal joint 1 forms the maximum operating angle is illustrated. In each track groove 7A of the outer joint member 2, the second track groove portion 7Ab having the linear ball raceway center line Xb is formed on the opening side. With the second track groove portion 7Ab, the effective track length at the maximum operating angle can be secured, and the excessive increase in wedge angle can be suppressed in a compact design. Therefore, even when a maximum operating angle $\theta_{max}$ is set as high as approximately 47° as illustrated in FIG. 6, the contact state can be secured between the ball 4 and the track groove portion 7Ab under a state in which an inlet chamfer 10 having a necessary and sufficient size is formed, and the increase in wedge angle can be suppressed.

In a range of high operating angles, the balls 4 arranged in the circumferential direction are temporarily positioned apart between the first track groove portions 7Aa and 9Aa (7Ba and 9Ba) (see FIG. 11A and FIG. 12B) and between the second track groove portions 7Ab and 9Ab (7Bb and 9Bb) (see FIG. 11A and FIG. 12B). Along with this, the forces applied from the balls 4 to the pocket portions 5a of the cage 5 are not balanced with each other, and hence the contact forces are generated between the spherical contact portions 12 and 6 of the cage 5 and the outer joint member 2 and between the spherical contact portions 13 and 8 of the cage 5 and the inner joint member 3, respectively. However, the angles in the range of high operating angles are used less frequently, and hence the constant velocity universal joint 1 according to this embodiment is comprehensively capable of suppressing the torque loss and heat generation. Thus, it is possible to attain a compact fixed type constant velocity universal joint that is suppressed in torque loss and heat generation, is enhanced inefficiency, is capable of forming high operating angles, and is excellent in strength and durability at the high operating angles.

In the above-mentioned one example of the constant velocity universal joint, the ball raceway center line Xb of the second track groove portion 7b and the ball raceway center line Yb of the second track groove portion 9b each have a linear shape, but the present invention is not limited thereto. The ball raceway center lines of the second track groove portions may each have a recessed arc shape or a protruding arc shape having a relatively large curvature radius. Also in this case, an effective track length at a maximum operating angle can be secured, and excessive increase in wedge angle can be suppressed.

The one example and the components of the constant velocity universal joint, in which the outer joint member manufactured based on the forging method according to the embodiment of the present invention is incorporated, are as described above. Next, the method of forging an outer joint member according to the embodiment of the present invention is described with reference to FIG. 16 to FIG. 28.

Figure 16:
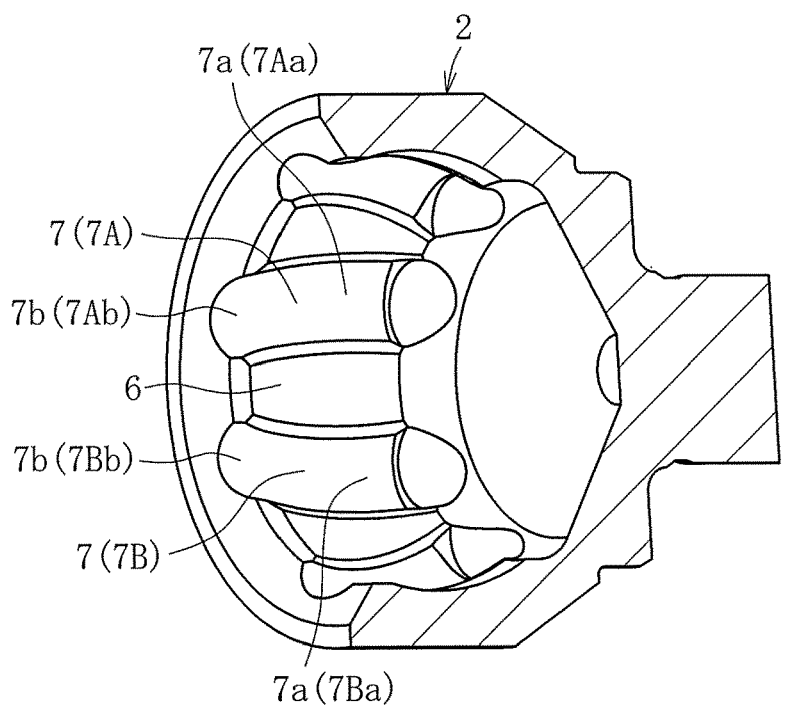
FIG. 16 is a perspective view of the outer joint member as viewed in a direction indicated by the arrows of the line S1-S1 of FIG. 11B.

FIG. 16 is a perspective view of a single finished product of the outer joint member 2 as viewed in a direction indicated by the arrows of the line S1-S1 of FIG. 11B. The details of the outer joint member 2 are as described above. The outer joint member 2 is formed of carbon steel for machine structural use (for example, S53C) or the like, and a hardened layer is formed on a surface of the outer joint member 2 by induction hardening. In the outer joint member 2, the first track groove portions 7a (7Aa and 7Ba) are formed on the far side, and the second track groove portions 7b (7Ab and 7Bb) are formed on the opening side. Both the track groove portions are smoothly continuous with each other. The spherical inner peripheral surface 6 is formed between the track grooves 7 (7A and 7B). Turning, spline processing, heat treatment, grinding, and the like are performed on a forged product after a forming step described later to obtain the finished product illustrated in FIG. 11.

Figure 17A:
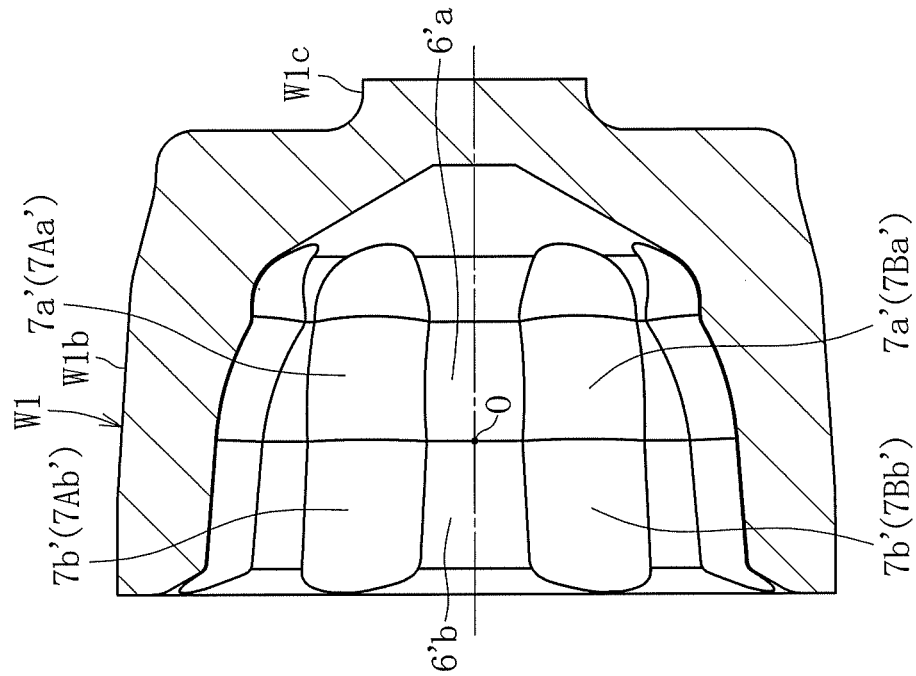
FIG. 17A is a longitudinal sectional view of a pre-processing material of the outer joint member in the forging method according to one embodiment of the present invention.
Figure 17B:
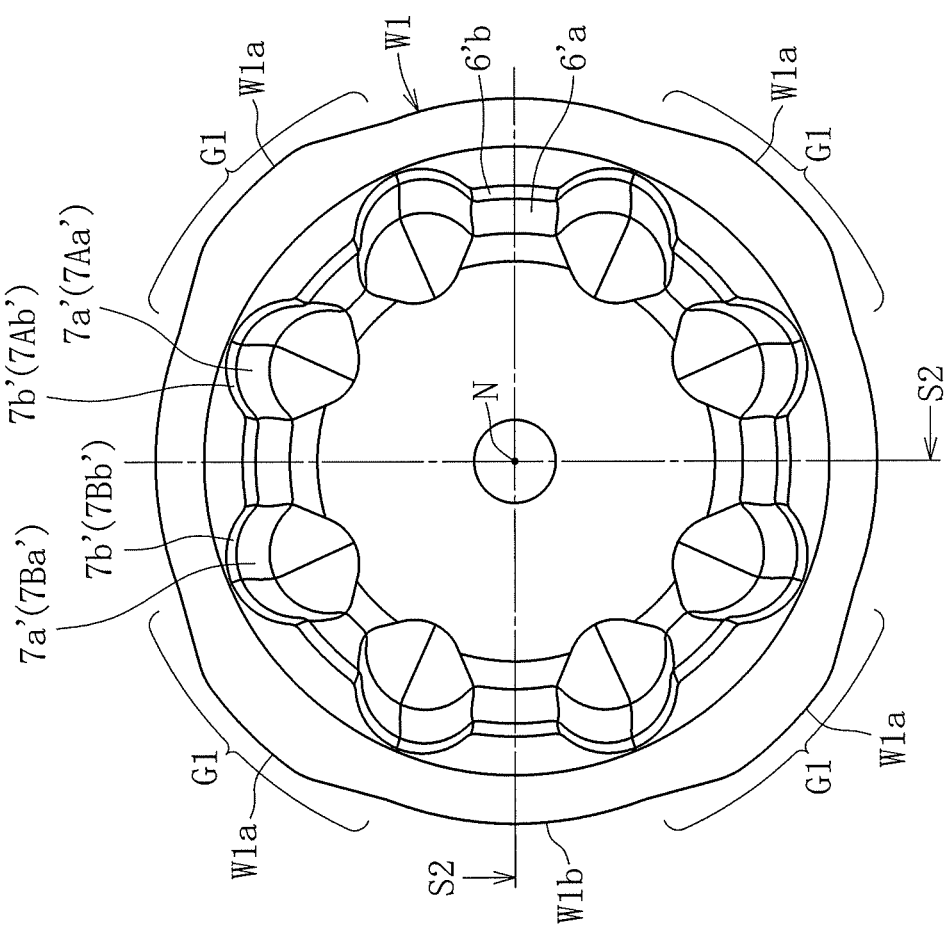
FIG. 17B is a side view of the pre-processing material of the outer joint member in the forging method according to one embodiment of the present invention.
Figure 18:
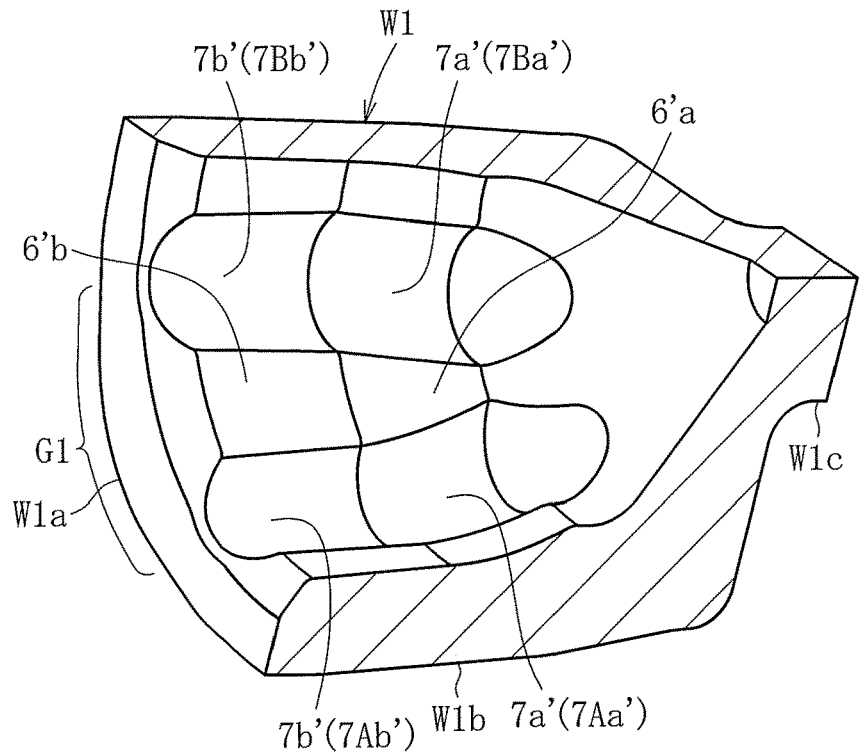
FIG. 18 is a perspective view of the pre-processing material as viewed in a direction indicated by the arrows of the line S2-N-S2 of FIG. 17B.
Figure 19:
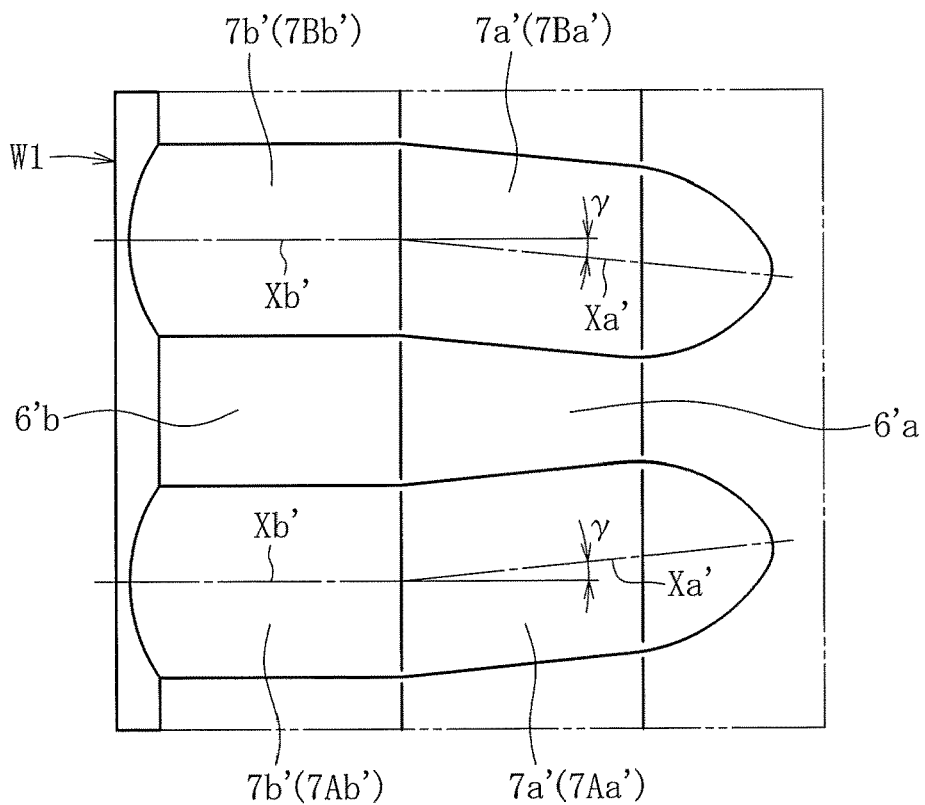
FIG. 19 is a partial developed view for illustrating an inner peripheral surface of the pre-processing material of FIG. 18.
Figure 20:
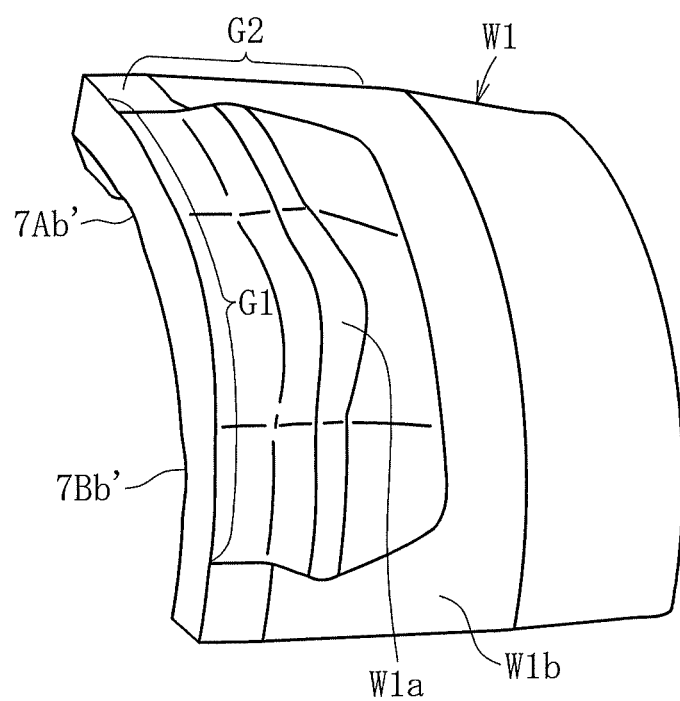
FIG. 20 is a partial perspective view for illustrating an outer peripheral surface of the pre-processing material of FIG. 18.

This embodiment has a feature in the method of forging the above-mentioned outer joint member 2. A pre-processing material in the forging method according to this embodiment is described with reference to FIG. 17 to FIG. 20. FIG. 17A is a longitudinal sectional view of the pre-processing material. FIG. 17B is a side view of the pre-processing material. FIG. 18 is a perspective view of the pre-processing material as viewed in a direction indicated by the arrows of the line S2-N-S2 of FIG. 17B. FIG. 19 is a developed view of an inner peripheral surface of the pre-processing material of FIG. 18. FIG. 20 is a perspective view of an outer peripheral surface of the pre-processing material of FIG. 18.

The pre-processing material before cold ironing in the forging method according to this embodiment, which is illustrated in FIG. 17A and FIG. 17B, is formed by sub-hot forging, and is subjected to surface lubrication treatment (for example, bonderizing treatment). A pre-processing material W1 comprises a cylindrical portion W1b and a shaft portion W1c, and, on an inner peripheral surface of the cylindrical portion W1b, surfaces 7a' (7Aa' and 7Ba') having a substantially finished shape (hereinafter simply referred to as "first track groove surfaces 7a' (7Aa' and 7Ba') having a substantially finished shape") corresponding to the first track groove portions 7a (7Aa and 7Ba) (see FIG. 16) are formed in a substantially half part on the far side from the joint center O of FIG. 17A. Surfaces 7b' (7Ab' and 7Bb') having a preliminary shape (hereinafter simply referred to as "second track groove surfaces 7b' (7Ab' and 7Bb') having a preliminary shape") corresponding to the remaining part from the first track groove portions 7a (7Aa and 7Ba) and the second track groove portions 7b (7Ab and 7Bb) having a linear shape are formed in a substantially half part on the opening side from the joint center O of FIG. 17A. The first track groove surfaces 7a' (7Aa' and 7Ba') having a substantially finished shape are inclined in the circumferential direction, and each have an arc shape about the joint center O defined as a curvature center. Meanwhile, the second track groove surfaces 7b' (7Ab' and 7Bb') having a preliminary shape each have a linear shape without inclination in the circumferential direction.

The first track groove surfaces 7a' (7Aa' and 7Ba') having a substantially finished shape of the pre-processing material W1 are formed in the substantially half part on the far side from the joint center O. In this configuration, the inclination angle γ of the track groove surfaces is relatively small, and the track groove surfaces on the substantially half part on the far side each have an arc shape about the joint center O defined as the curvature center. Therefore, the pre-processing material W1 can be formed by an integral punch in the sub-hot forging without interference between shoulder portions of the first track groove surfaces 7a' (7Aa' and 7Ba') having a substantially finished shape. With this, increase in forging cost can be suppressed, and the accuracy of the track grooves can be enhanced.

An inner peripheral surface 6' a having a substantially finished shape (hereinafter simply referred to as "spherical inner peripheral surface 6'a having a substantially finished shape") corresponding to the spherical inner peripheral surface 6 (see FIG. 16) is formed in the substantially half part on the far side from the joint center O of FIG. 17A, and an inner peripheral surface 6'b having a preliminary shape with a substantially cylindrical shape (hereinafter simply referred to as "substantially cylindrical inner peripheral surface 6'b having a preliminary shape") is formed in the substantially half part on the opening side from the joint center O of FIG. 17A.

In a perspective view of FIG. 18, the first track groove surfaces 7a' (7Aa' and 7Ba') having a substantially finished shape, the second track groove surfaces 7b' (7Ab' and 7Bb') having a preliminary shape, the spherical inner peripheral surface 6'a having a substantially finished shape, and the substantially cylindrical inner peripheral surface 6'b having a preliminary shape of the pre-processing material W1 are illustrated in a more understandable way. The second track groove surfaces 7b' (7Ab' and 7Bb') having a preliminary shape and the substantially cylindrical inner peripheral surface 6'b having a preliminary shape each have a tapered shape slightly radially expanded toward the opening side as a draft of a die.

Further, in a developed view of FIG. 19, inclined states in the circumferential direction of the first track groove surfaces 7a' (7Aa' and 7Ba') having a substantially finished shape and the second track groove surfaces 7b' (7Ab' and 7Bb') having a preliminary shape are illustrated in a more understandable way. Ball raceway center lines Xa' of the first track groove surfaces 7a' (7Aa' and 7Ba') having a substantially finished shape are each inclined at an angle γ in the circumferential direction with respect to the joint axial line N-N (see FIG. 11A). Meanwhile, ball raceway center lines Xb' of the second track groove surfaces 7b' (7Ab' and 7Bb') having a preliminary shape each have a linear shape without inclination in the circumferential direction.

As illustrated in FIG. 20, on the outer peripheral surface of the pre-processing material W1, protruding portions W1a having a thickness increased by partially increasing an outer diameter are formed at four positions in the circumferential direction. The protruding portions W1a are formed so as to secure a sufficient amount of a material at the time of formation of inclining the second track groove surfaces 7Ab' and 7Bb' having a preliminary shape of FIG. 18 in opposite directions in the circumferential direction. In other words, the protruding portions W1a are formed so as to secure the sufficient amount of the material at the time of formation of increasing intervals between the second track groove surfaces 7Ab' and 7Bb' having a preliminary shape in the circumferential direction on the opening side. Therefore, the protruding portions W1a are partially formed in ranges of G1 and G2 illustrated in FIG. 17B, FIG. 18, and FIG. 20. The specific shapes of the protruding portions W1a are set in consideration of a state of sufficiency of the material.

Figure 1:
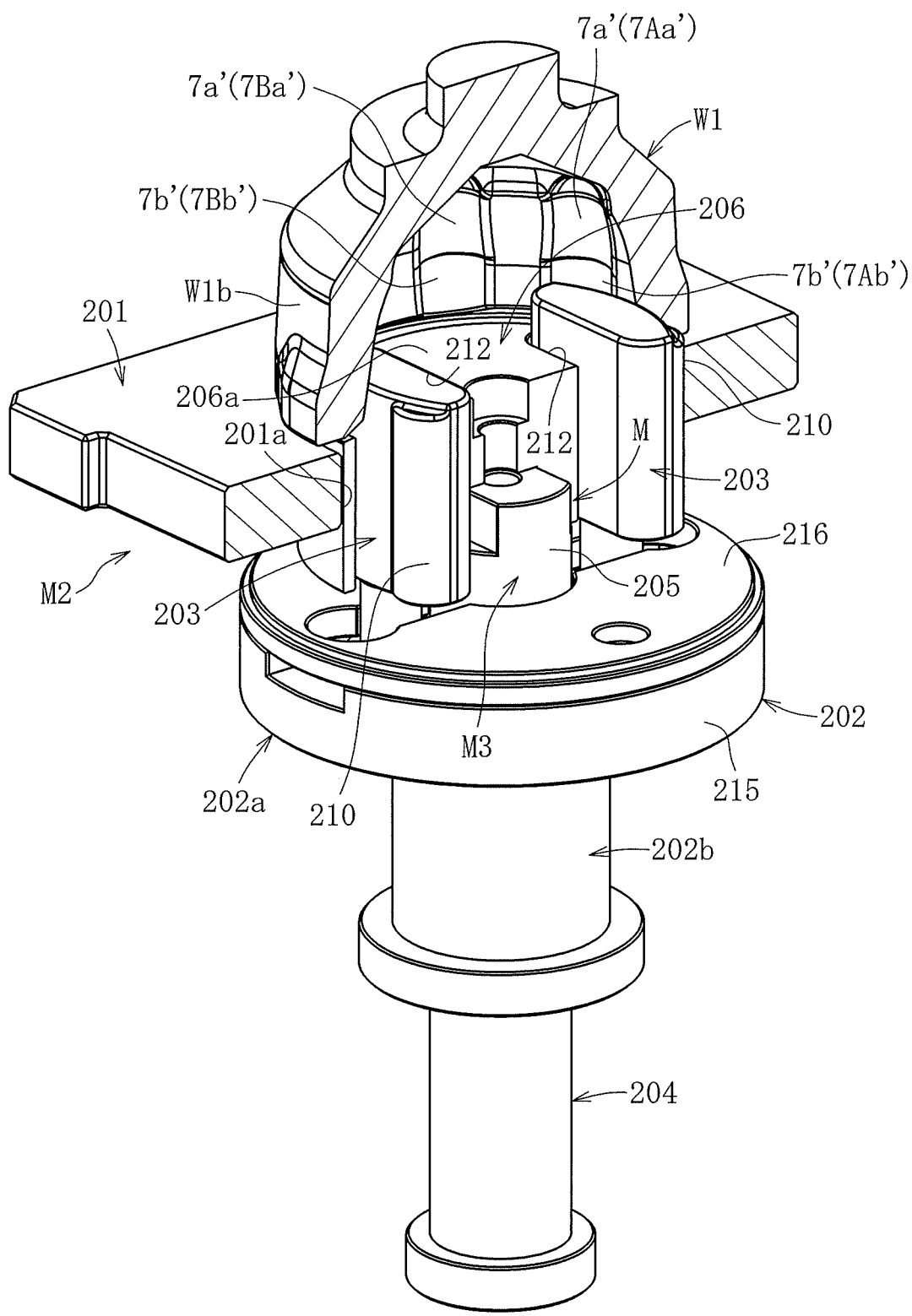
FIG. 1 is a perspective view of a main part of a forging apparatus for an outer joint member of a constant velocity universal joint according to the present invention under a state in which phase alignment is performed with use of a phase alignment mechanism.
Figure 21A:
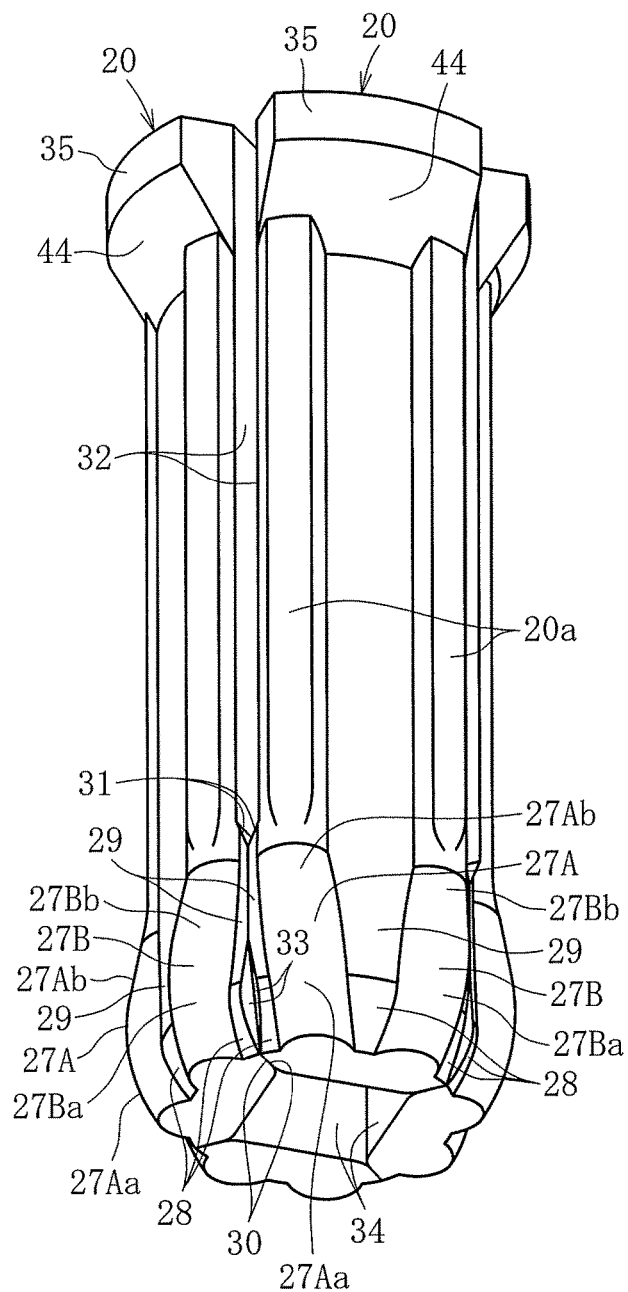
FIG. 21A is an illustration of a forging die, and is a perspective view of punches.
Figure 21B:
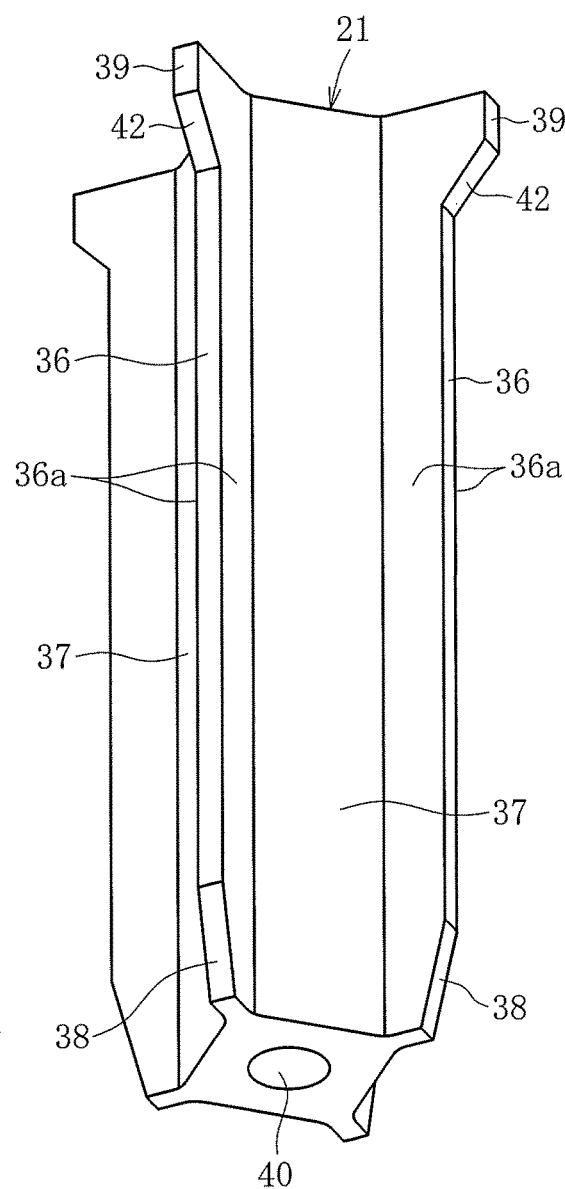
FIG. 21B is an illustration of the forging die, and is a perspective view of a punch base.
Figure 22A:
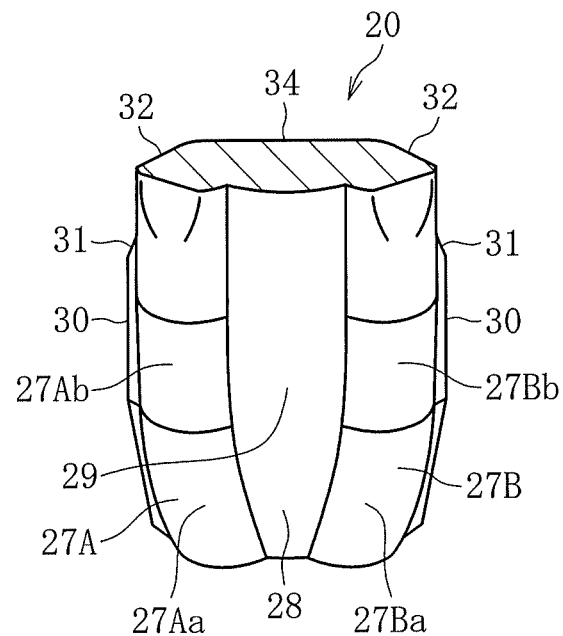
FIG. 22A is an illustration of a forming part at a distal end of the forging die of FIGS. 21A, and is a perspective view of the punch.
Figure 22B:
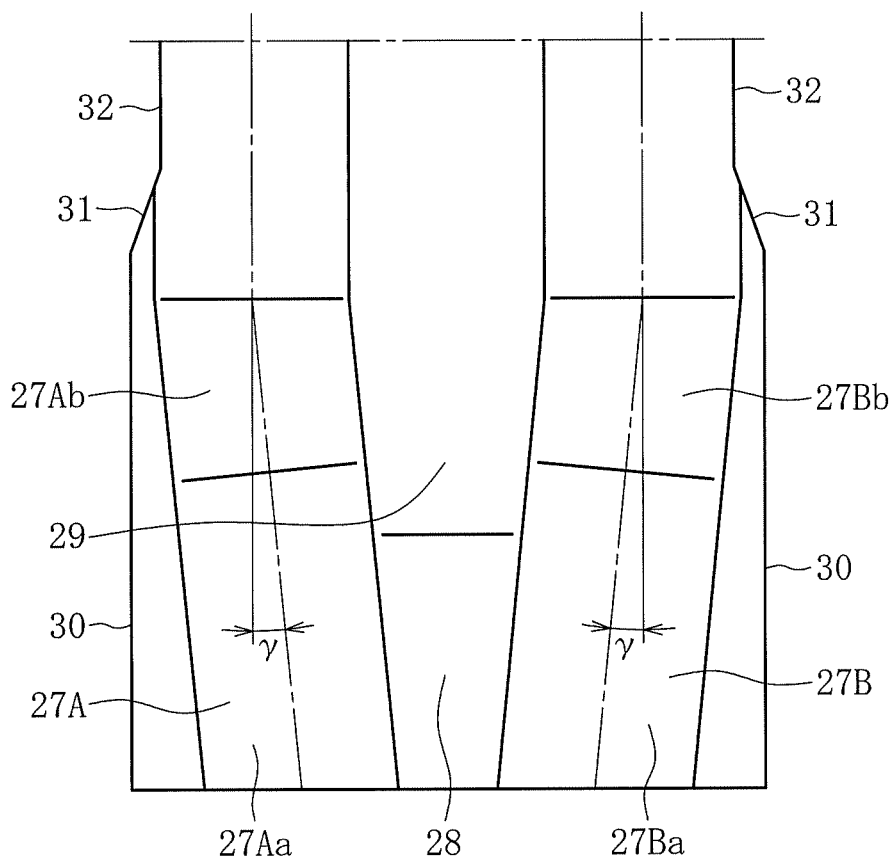
FIG. 22B is an illustration of the forming part at the distal end of the forging die of FIGS. 21A, and is a developed view of the punch.

Incidentally, a forging apparatus according to the present invention comprises an ironing mechanism M1 (see FIG. 26 and the like) configured to subject the pre-processing material W1 to cold ironing, and a phase position alignment mechanism M2 (see FIG. 1 and the like). The ironing mechanism M1 is described with reference to FIG. 21 to FIG. 26. FIG. 21A is a perspective view for illustrating punches, and FIG. 21B is a perspective view for illustrating a punch base. FIG. 22A is an enlarged perspective view of a distal end portion of the punch, and FIG. 22B is a further enlarged developed view of an outer peripheral surface of the punch of FIG. 22A. As illustrated in FIG. 21A and FIG. 22A, punches 20 are divided into four parts. On an outer peripheral portion of a distal end of each punch 20, there are formed first track groove portion forming surfaces 27Aa and 27Ba for forming the first track groove portions 7Aa and 7Ba (see FIG. 16), and second track groove portion forming surfaces 27Ab and 27Bb for forming the second track groove portions 7Ab and 7Bb (see FIG. 16). As illustrated in FIG. 22B, the first track groove portion forming surfaces 27Aa and 27Ba and the second track groove portion forming surfaces 27Ab and 27Bb are each inclined at an angle γ in the circumferential direction with respect to the joint axial line N-N (see FIG. 11A). At a position corresponding to the opening side end portion A of the first track groove portions 7Aa and 7Ba (see FIG. 13), the track groove portion forming surfaces 27Aa and 27Ab are continuous with each other, and the track groove portion forming surfaces 27Ba and 27Bb are continuous with each other.

Between the first track groove portion forming surfaces 27Aa and 27Ba, a spherical forming surface 28 for forming the spherical inner peripheral surface 6 is formed in a region from an axial position of the joint center O (see FIG. 11A) to a distal end of the punch 20 (far side of the joint), and a cylindrical forming surface 29 is formed in a region from the spherical forming surface 28 to the axial center side of the punch 20 (on the upper side of FIG. 21A and FIG. 22B).

The first track groove portion forming surface 27Aa and the second track groove portion forming surface 27Ab are collectively referred to as "track groove forming surface 27A", and the first track groove portion forming surface 27Ba and the second track groove portion forming surface 27Bb are collectively referred to as "track groove forming surface 27B".

As illustrated in FIG. 21A, an end surface of the punch 20 in the circumferential direction comprises abutment surfaces 30 to be held in abutment against flange surfaces 36a (see FIG. 21B) of the punch base 21 at the time of radially expanding the punch 20 described later, and stepped surfaces 32 for forming a radial contraction space for the punches 20, which are formed through tapered stepped portions 31 from the abutment surfaces 30. Chamfered portions 33 are formed on the abutment surfaces 30 of each punch 20 so as to suppress nipping of the material at the time of formation.

An inner abutment surface 34 to be guided by the punch base 21 is formed on a radially inner side of the punch 20. The four punches 20 are radially contracted to bring the abutment surfaces 30 in the circumferential direction into abutment against each other. At this time, a contour of a transverse section formed by the four inner abutment surfaces 34 becomes a square shape. A projecting portion 35 is formed on another end portion of the punch 20 (on the upper side of FIG. 21A), and a surface of the projecting portion 35 in the axial direction serves as a positioning tapered stepped portion 44.

In the related art, one punch is arranged for one track groove to be subjected to cold processing. In contrast, in the structure of this embodiment, the pair of adjacent track groove forming surfaces 27A and 27B are arranged in one punch 20. That is, unlike the related-art punch arrangement, a gap between the punches for the pair of adjacent track groove forming surfaces 27A and 27B is eliminated, and the pair of track groove forming surfaces 27A and 27B are integrally formed on one punch 20. Therefore, the sectional area of the punch 20 in this embodiment is about 3 to 4.5 times larger than the sectional area of the related-art punch. The sectional area per track groove forming surface is increased to be 1.5 to 2.25 times larger than that in the related art, and the bending rigidity is increased to be equal to or more than 4.2 times larger than that in the related art. That is, with the increase in structural strength and rigidity, formation with high accuracy can be attained. Further, the region having a small thickness of a shoulder portion of the punch is eliminated. Thus, stress concentration is alleviated, thereby being capable of prolonging the life of the die.

Figure 23:
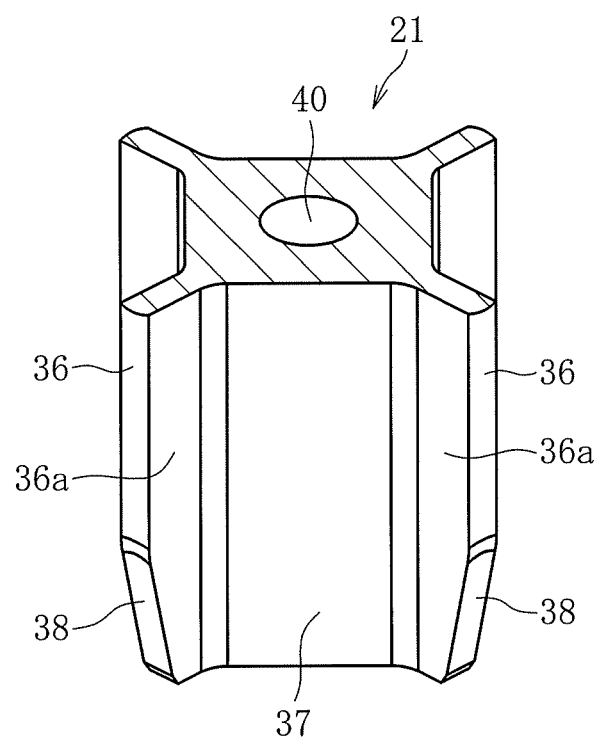
FIG. 23 is a perspective view of a distal end portion of the punch base.

Next, the punch base 21 configured to guide the punch 20 so as to enable advancing and retreating is described with reference to FIG. 21B and FIG. 23. FIG. 23 is a perspective view of the distal end portion of the punch base 21 as viewed in a direction different from that in FIG. 21B. The punch base 21 has a substantially quadrangular prism shape, and comprises four bottom surfaces 37 configured to guide the inner abutment surfaces 34 of the punches 20, and flange portions 36 configured to guide the abutment surfaces 30 of the punches 20 in the circumferential direction from the corner portions of the four bottom surfaces 37. The flange surfaces 36a are formed on both sides of each of the flange portions 36. On a distal end portion of each of the flange portions 36 (on the lower side of FIG. 21B), a tapered surface 38 with a contour corresponding to that of the chamfered portion 33 of the punch 20 described above is formed. On another end portion of the flange portion 36 (on the upper side of FIG. 21B), a projecting portion 39 is formed, and a surface of the projecting portion 39 in the axial direction serves as a positioning tapered stepped portion 42. At the center of the punch base 21, there is formed a through hole 40 through which a shaft portion of an umbrella punch 22 (see FIG. 24B) is inserted so as to enable advancing and retreating.

In a case of the cold processing in the related art, a punch base in a region, which corresponds to the track grooves and is close to the distal end sides of the punches, is thin, and the amount of radial contraction of the punches is restricted. In this embodiment, the pair of adjacent track groove forming surfaces 27A and 27B are arranged in one punch 20. Therefore, the thickness can be increased as compared to the related-art punch base. With this, even in a case of an outer joint member of a constant velocity universal joint that has a large number of track grooves and is capable of forming a high operating angle, an outer joint member of a track groove crossing type that has a required track length can be formed.

Further, in the punch base 21, which is reduced in number of grooves formed by the bottom surfaces 37 and the flange surfaces 36a configured to guide the punches 20, the sectional shape of the groove is changed from the sharp corner shape to the shape of the smooth bottom surface 37. Thus, the stress concentration is alleviated, thereby being capable of prolonging the life of the punch base 21. Further, with the above-mentioned reduction in number of grooves, the rigidity of the integrated punch base 21 is increased, thereby giving an effect of enhancing accuracy of a forged product.

Figure 24A:
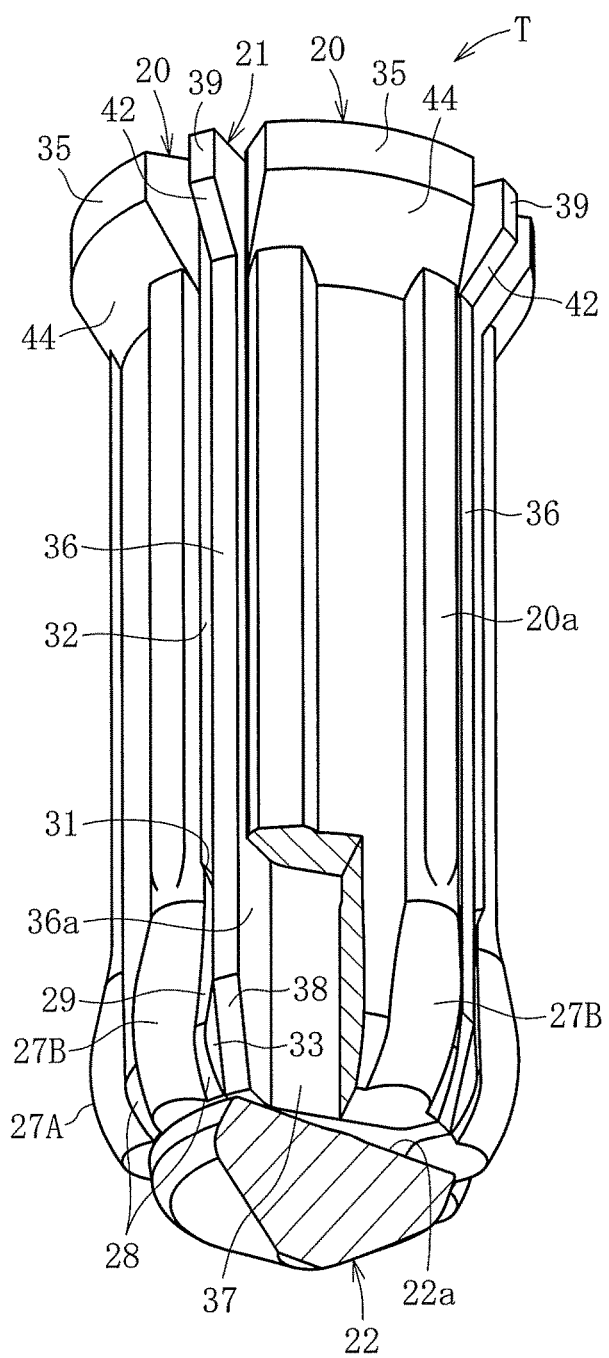
FIG. 24A is an illustration of a state in which the punches are combined with the punch base, and is a perspective view for illustrating a state in which the punches are radially expanded.
Figure 24B:
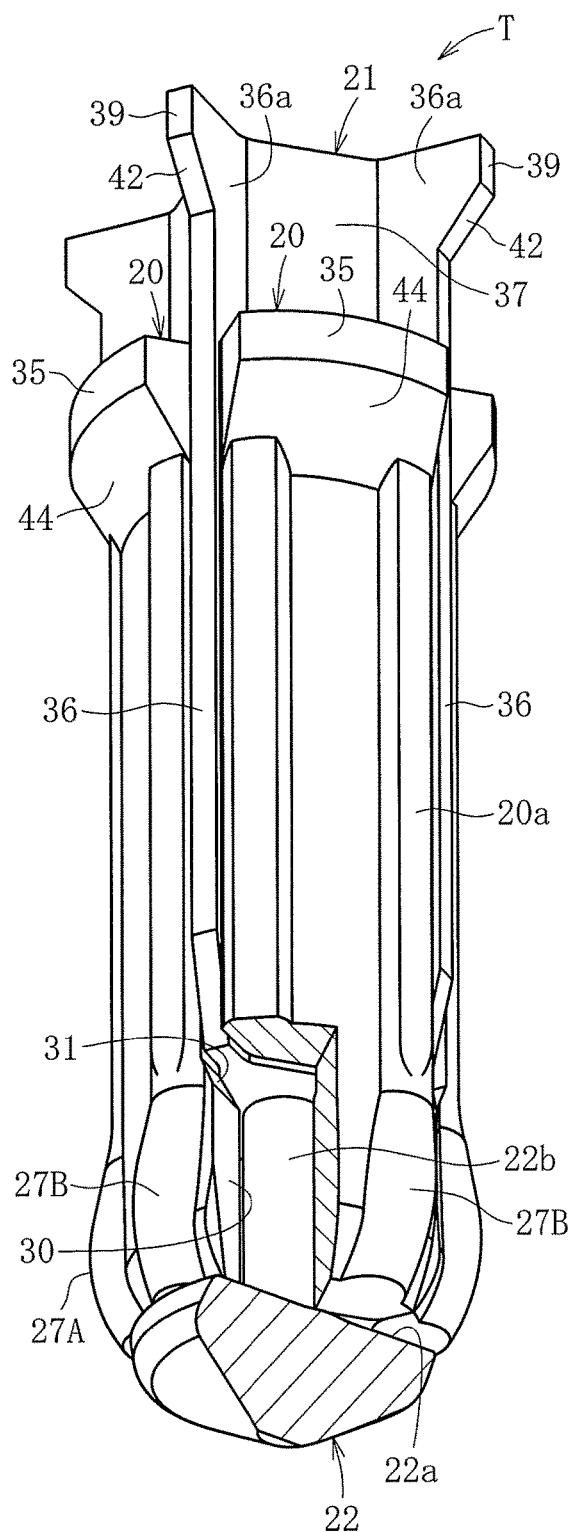
FIG. 24B is an illustration of the state in which the punches are combined with the punch base, and is a perspective view for illustrating a state in which the punches are radially contracted.
Figure 25:
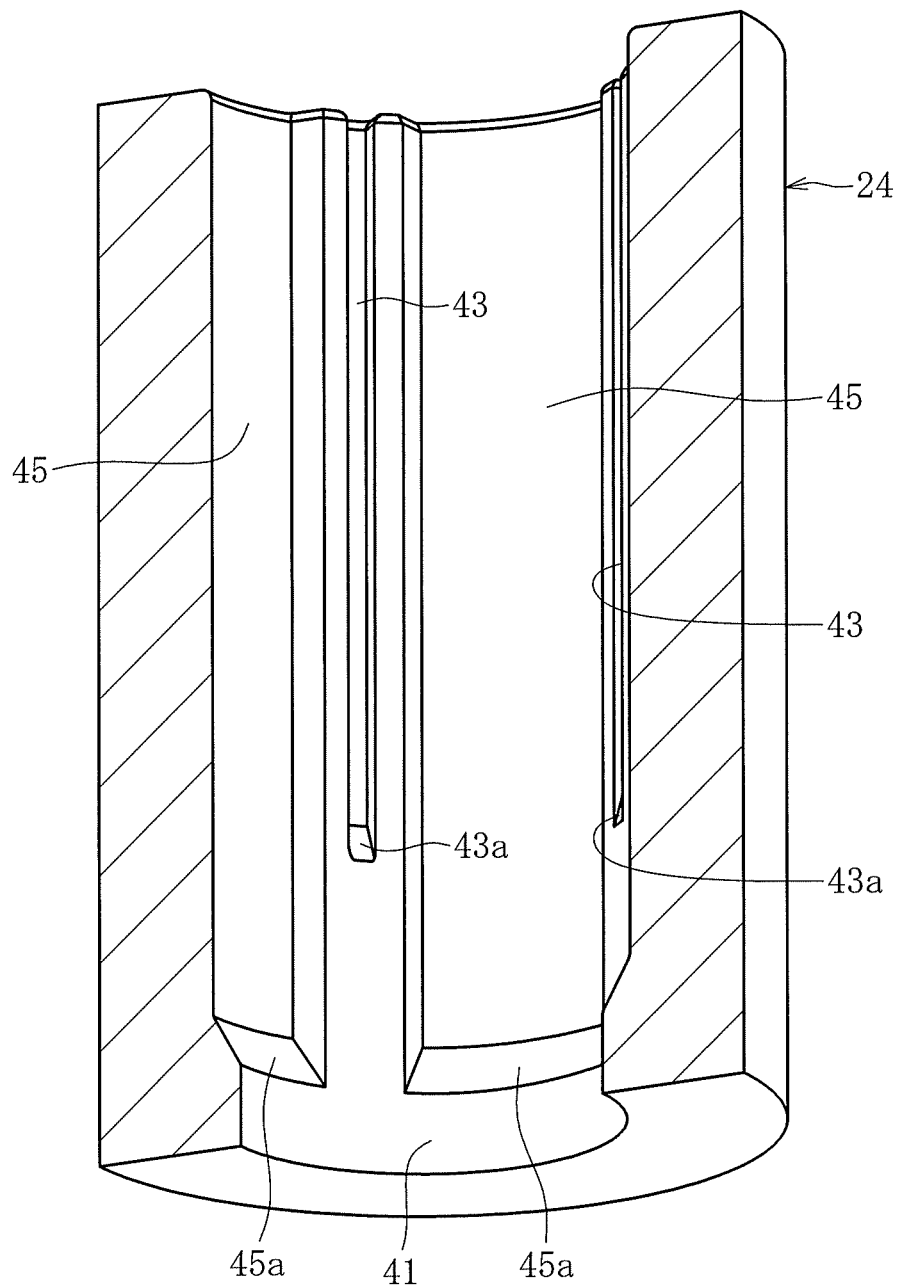
FIG. 25 is a perspective view of a punch holder as viewed in longitudinal section.

Next, an expanding and contracting operation and a relative advancing and retreating operation of the punches 20 and the punch base 21 are described with reference to FIG. 24A and FIG. 24B. FIG. 24A is a perspective view for illustrating a radially expanded state of the punches 20, and FIG. 24B is a perspective view for illustrating a radially contracted state of the punches 20. A punch set in the description and the claims refers to a set including the punches 20 and the punch base 21 illustrated in FIG. 24A and FIG. 24B, and more preferably, refers to a set including the punches 20, the punch base 21, and the umbrella punch 22. The punch set is denoted by reference symbol T. As illustrated in FIG. 24A, the flange portions 36 of the punch base 21 are inserted between the abutment surfaces 30 (see FIG. 24B) of the punches 20. At the same time, each of the abutment surfaces 30 and each of the flange surfaces 36a are brought into abutment against each other, and the distal end surfaces of the respective punches 20 and the distal end surface of the punch base 21 are brought into abutment against a back surface 22a of the umbrella punch 22 to be arrayed. With this, the respective punches 20 are retained with respect to the joint center O (see FIG. 10A). This state corresponds to the radially expanded state of the punches 20.

The respective punches 20 are guided from the radially expanded state of FIG. 24A along the bottom surfaces 37 and the flange surfaces 36a of the punch base 21 to advance downward. Then, when the distal ends of the flange surfaces 36a of the punch base 21 pass by the tapered stepped portions 31 of the punches 20, the gap is formed between each of the stepped surfaces 32 (see FIG. 22A) of the punches 20 and each of the flange surfaces 36a of the punch base 21 so that the radial contraction space for the punches 20 is secured. In this manner, as illustrated in FIG. 24B, the punches 20 are brought into the radially contracted state.

The expanding and contracting operation and the relative advancing and retreating operation of the punches 20 and the punch base 21 are as described above. Meanwhile, the punches 20 and the punch base 21 are received and guided into an inner peripheral hole 41 of a punch holder 24 illustrated in FIG. 25, and perform the relative advancing and retreating operation described above. Specifically, in the inner peripheral hole 41 of the punch holder 24, there are formed axial grooves 43 in which the projecting portions 39 (see FIG. 21B) of the flange portions 36 of the punch base 21 are slidably fitted, and tapered stopper surfaces 43a are formed at lower end portions of the axial grooves 43. The positioning tapered stepped portions 42 of the projecting portions 39 of the flange portions 36 of the punch base 21 are locked to the tapered stopper surfaces 43a, thereby determining a downward advancing stroke of the punch base 21. The outer peripheral surfaces of the flange portions 36 of the punch base 21 are guided along the inner peripheral hole 41 of the punch holder 24.

In the inner peripheral hole 41 of the punch holder 24, there are further formed axial grooves 45 in which the projecting portions 35 of the punches 20 (see FIG. 21A) are slidably fitted, and tapered stopper surfaces 45a are formed at lower end portions of the axial grooves 45. The positioning tapered stepped portions 44 of the projecting portions 35 of the punches 20 are locked to the tapered stopper surfaces 45a, thereby determining a downward advancing stroke of the punches 20. Outer peripheral surfaces 20a of the punches 20 are guided along the inner peripheral hole 41 of the punch holder 24.

Due to the tapered stopper surfaces 43a and the tapered stopper surfaces 45a formed in the punch holder 24, the length of the advancing stroke of the punch base 21 is small, and the length of the advancing stroke of the punches 20 is large. With this, after the punch base 21 is stopped, advancement of the punches 20 continues through guiding of the abutment surfaces 30 of the punches 20 along the flange surfaces 36*a* of the punch base 21, and when the tapered stepped portions 31 of the punches 20 pass by the distal ends of the flange surfaces 36*a* of the punch base 21, the gap is formed between each of the stepped surfaces 32 of the punches 20 and each of the flange surfaces 36*a* of the punch base 21 so that the radial contraction space for the punches 20 is secured. In this manner, the radially contracting operation of the punches 20 can be performed with a simple mechanism.

Figure 26:
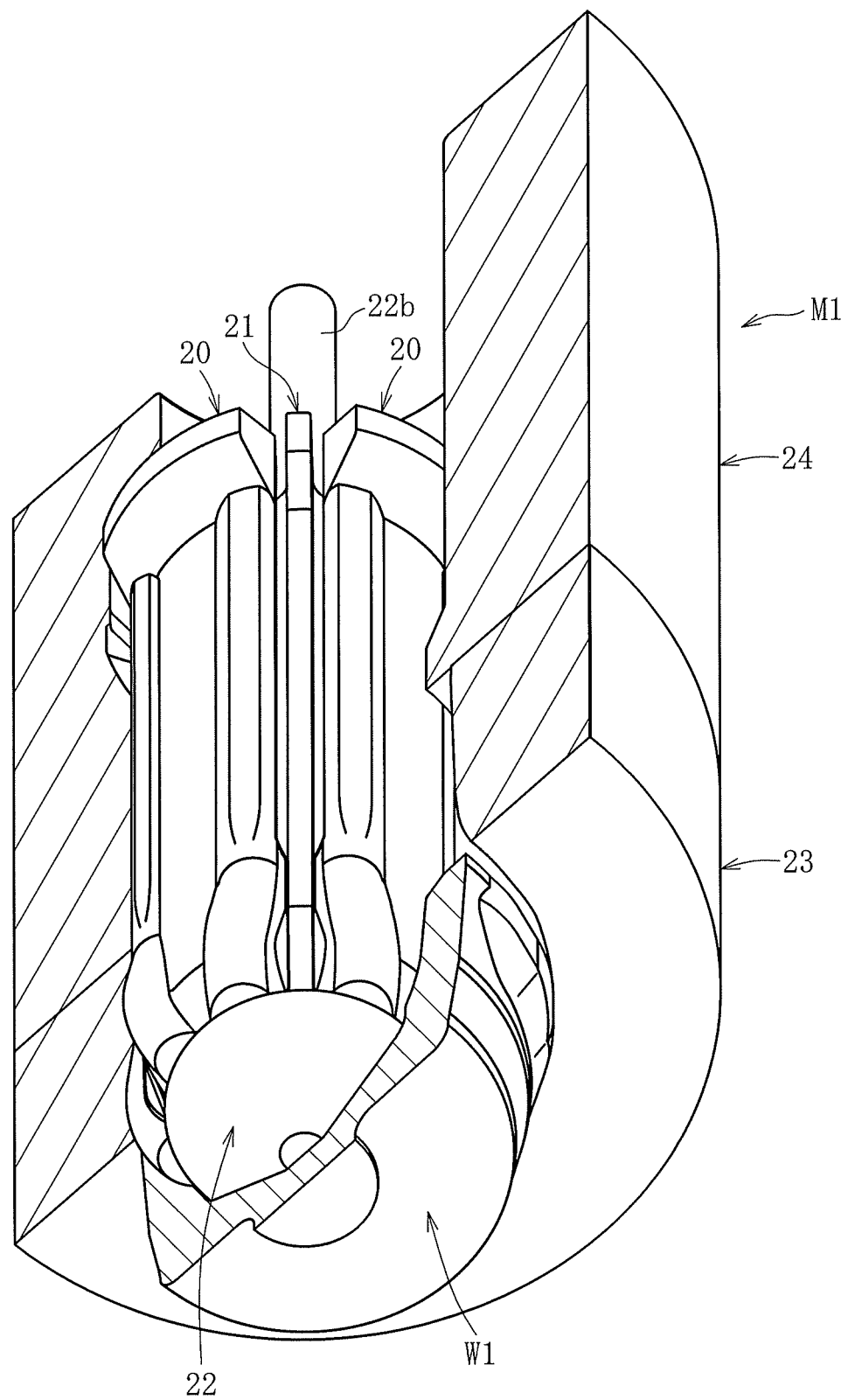
FIG. 26 is a perspective view for illustrating a state in which a die is set.

In a perspective view of FIG. 26, a state in which the die to be used in the forging method according to this embodiment is set is illustrated. The punches 20 and the punch base 21 are received in the punch holder 24, and the umbrella punch 22 is inserted through the punch base 21. A die 23 is mounted and fixed to a slide of a press machine described later together with the punch holder 24. FIG. 26 is an illustration of an arrangement state of the die when the umbrella punch 22, the punches 20, and the punch base 21 are inserted in the inner peripheral portion of the pre-processing material W1 and the die 23 starts formation of subjecting the outer peripheral portion of the pre-processing material W1 to the ironing (see FIG. 27B).

Next, the specific forming step is described with reference to FIG. 27 and FIG. 28. FIG. 27A to FIG. 27C are illustrations of a process from loading of the pre-processing material to the completion of formation. FIG. 28A to FIG. 28C are illustrations of a process to removing of the forged product after the completion of formation.

Figure 27A:
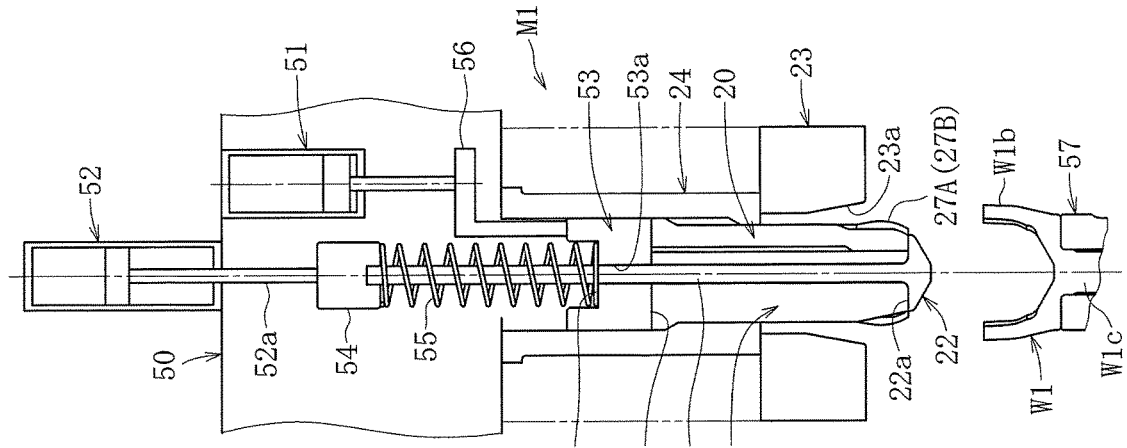
FIG. 27A is an illustration of a forming step, and is a sectional view for illustrating a state in which a workpiece is loaded to a press machine.
Figure 28A:
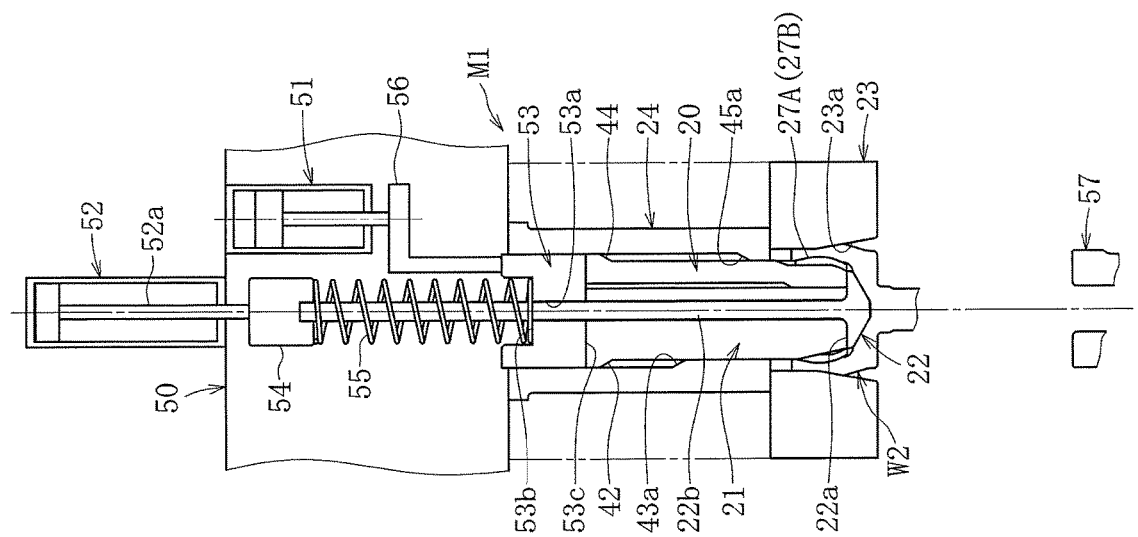
FIG. 28A is an illustration of are moving step, and is a sectional view for illustrating a state in which the workpiece is removed from a plate.

With reference to FIG. 27A, the outlines of the die mounted to the press machine and a pressurizing device are described. The die set including the die 23 and the punch holder 24 receiving the punch 20, the punch base 21, the umbrella punch 22, and the like, a pressurizing cylinder 51, and a knockout cylinder 52 are mounted and fixed to a slide 50 configured to be raised and lowered by, for example, a hydraulic drive source of the press machine. The punches 20, the punch base 21, the umbrella punch 22, and a pressing member 53 are slidably received inside the punch holder 24. A shaft portion 22*b* of the umbrella punch 22 is slidably fitted through a through hole 53*a* formed at the center of the pressing member 53. The shaft portion 22*b* of the umbrella punch 22 is coupled to a rod 52*a* of the knockout cylinder 52 through intermediation of a spring receiving member 54. A spring receiving portion 53*b* is formed on an upper surface of the pressing member 53, and a compression coil spring 55 is incorporated between the spring receiving portion 53*b* and the spring receiving member 54. Due to an urging force of the compression coil spring 55, the punches 20 and the punch base 21 are retained and arrayed between the back surface 22*a* of the umbrella punch 22 and a lower surface 53*c* of the pressing member 53. The pressurizing cylinder 51 presses the pressing member 53 through intermediation of a coupling member 56. A plate 57 is mounted and fixed to a lower portion of the press machine, and the pre-processing material W1 is set on the plate 57.

Detailed description is given of the forming step. As illustrated in FIG. 27A, in a state in which a workpiece is loaded, the slide 50 is positioned at a top dead center, and a certain pressure is applied to the pressurizing cylinder 51, whereas a pressure is not applied to the knockout cylinder 52. The pressure state of the pressurizing cylinder 51 and the knockout cylinder 52 is maintained until the completion of formation. In this state, the pre-processing material W1 is set on the plate 57 so as to align a phase thereof with phases of the punches 20.

Figure 27B:
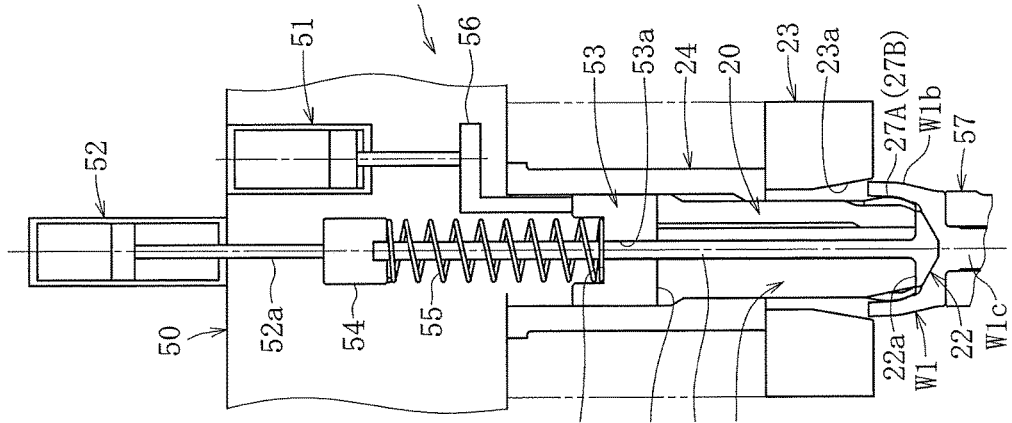
FIG. 27B is an illustration of the forming step, and is a sectional view for illustrating a state in which formation is started.

After the workpiece is loaded, as illustrated in FIG. 27B, in a state in which formation is started, the pressurizing cylinder 51 is in a state of receiving a certain pressure load so that the slide 50 is lowered, the umbrella punch 22 is brought into abutment against a cup bottom surface of the pre-processing material W1 while keeping a constant pressure, and the slide 50 is lowered up to a position at which an opening end portion of the pre-processing material W1 faces a die hole 23*a* of the die 23.

Figure 27C:
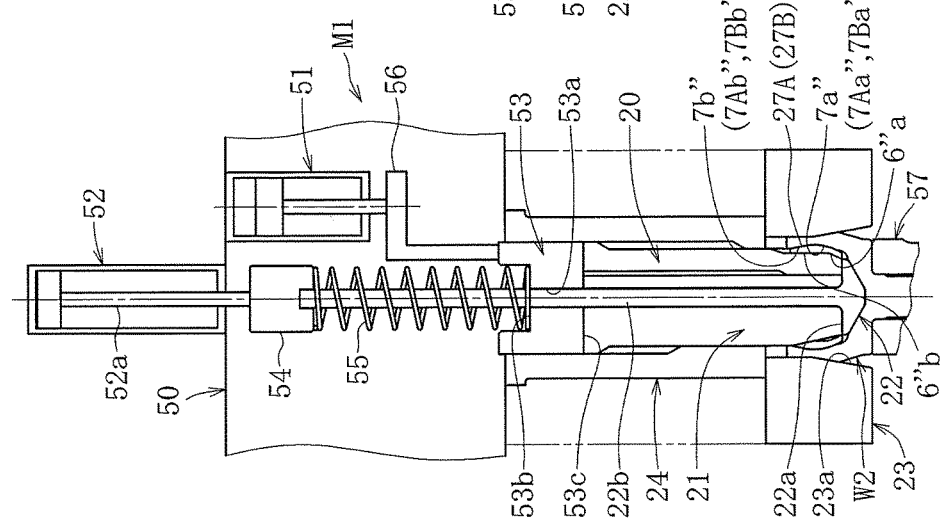
FIG. 27C is an illustration of the forming step, and is a sectional view for illustrating a state in which the formation is completed.

In the state in which the umbrella punch 22 is held in abutment against the cup bottom surface of the pre-processing material W1 while keeping the constant pressure, and the axial positions of the track groove forming surfaces 27A and 27B of each of the punches 20 are stabilized, as illustrated in FIG. 27C, the die 23 is lowered to press the outer peripheral surface from the opening side of the pre-processing material W1, the slide 50 reaches a bottom dead center, and the inner peripheral portion of the pre-processing material W1 is pressed against the track groove forming surfaces 27A and 27B, the spherical forming surface 28, and the cylindrical forming surface 29 of each of the punches 20. In this manner, finishing formation of the track groove surfaces 7*a*' and 7*b*', the spherical inner peripheral surface 6'*a* on the far side, and the cylindrical inner peripheral surface 6'*b* on the opening side in the entire region in the axial direction is completed.

Specifically, on the far side of the pre-processing material W1, the first track groove surfaces 7*a*' (7Aa' and 7Ba') having a substantially finished shape become first track groove surfaces 7*a*" (7Aa" and 7Ba") having a finished shape, and the spherical inner peripheral surface 6' having a substantially finished shape becomes a spherical inner peripheral surface 6" a having a finished shape. Further, on the opening side of the pre-processing material W1, the second track groove surfaces 7*b*' (7Ab' and 7Bb') having a preliminary shape become second track groove surfaces 7*b*" (7Ab" and 7Bb") having a finished shape, and the substantially cylindrical inner peripheral surface 6'*b* having a preliminary shape becomes a substantially cylindrical inner peripheral surface 6"*b* having a finished shape. The finished shape in the description refers to a shape to be kept in the forged product.

In the above-mentioned formation, the protruding portions W1*a* are formed on the pre-processing material W1. Thus, a sufficient amount of the material is secured at the time of formation of increasing the intervals between the second track groove surfaces 7Ab' and 7Bb' having a preliminary shape in the circumferential direction on the opening side.

Due to a springback phenomenon after the completion of formation, a forged product W2 is in a state of being held by the die 23. As described above, through the ironing in which the die 23 presses and pushes the outer peripheral surface from the opening portion side of the pre-processing material W1, the material sufficiency at the inner peripheral portion of the pre-processing material W1 can be enhanced. With the structure in which the above-mentioned pair of track groove forming surfaces 27A and 27B are integrally formed on one punch 20 and the ironing involving pushing from the opening portion side of the cylindrical portion W1*b* of the pre-processing material W1, formation with high accuracy, prolongment in life of the die, and the like can be further promoted.

After the completion of formation, a removing step for the forged product W2 is performed. The pressure applied by the pressurizing cylinder 51 is relieved so that the pressure applied by the umbrella punch 22 to the cup bottom surface of the forged product W2 is eliminated. Then, as illustrated in FIG. 28A, the slide 50 is raised so that the forged product W2, the punches 20, the punch base 21, and the umbrella punch 22, which are held inside the die 23, are raised. Thus, the forged product W2 is removed from the plate 57 so that the slide 50 reaches the top dead center.

Figure 28B:
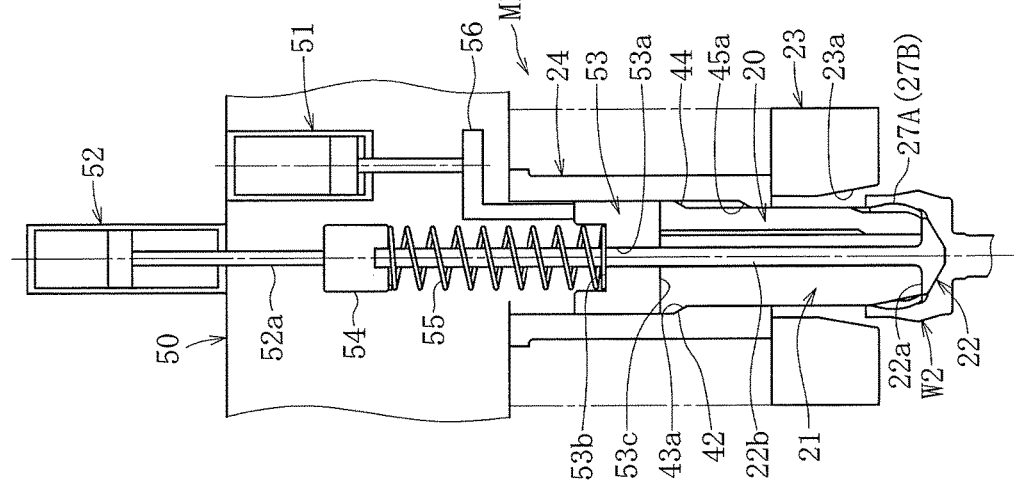
FIG. 28B is an illustration of the removing step, and is a sectional view for illustrating the state in which the workpiece is removed from the die.

After that, as illustrated in FIG. 28B, the pressure is applied to the pressurizing cylinder 51 so that the umbrella punch 22 presses the cup bottom surface of the forged product W2 through intermediation of the punches 20 and the punch base 21, and the forged product W2 is separated from the die 23. When the punch base 21 is lowered up to this state, the tapered stepped portions 42 of the punch base 21 are locked to the tapered stopper surfaces 43a of the punch holder 24, and the lowering operation of the punch base 21 is stopped.

Figure 28C:
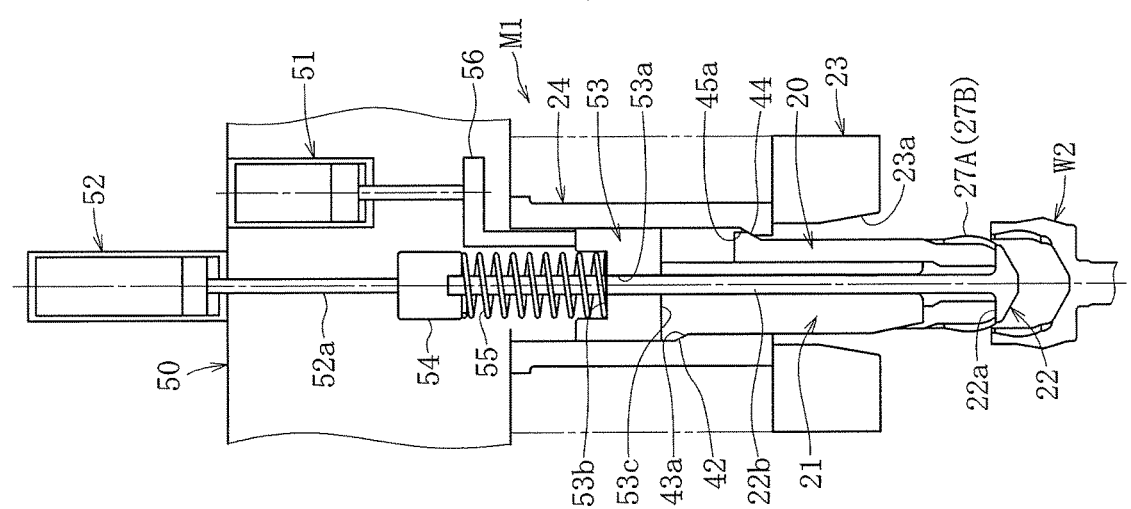
FIG. 28C is an illustration of the removing step, and is a sectional view for illustrating the state in which the workpiece is removed from the punches.
Figure 29:
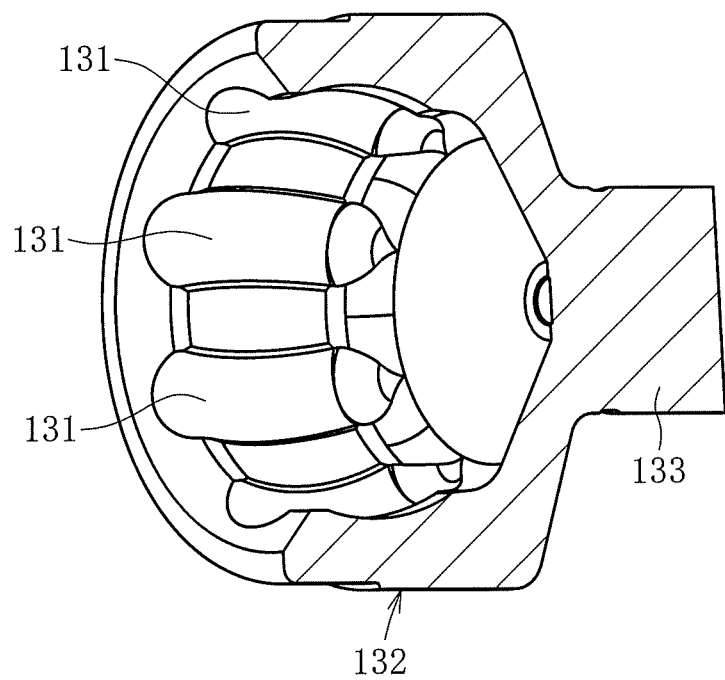
FIG. 29 is a perspective view of a general outer joint member of a constant velocity universal joint in partial cross section.
Figure 30:
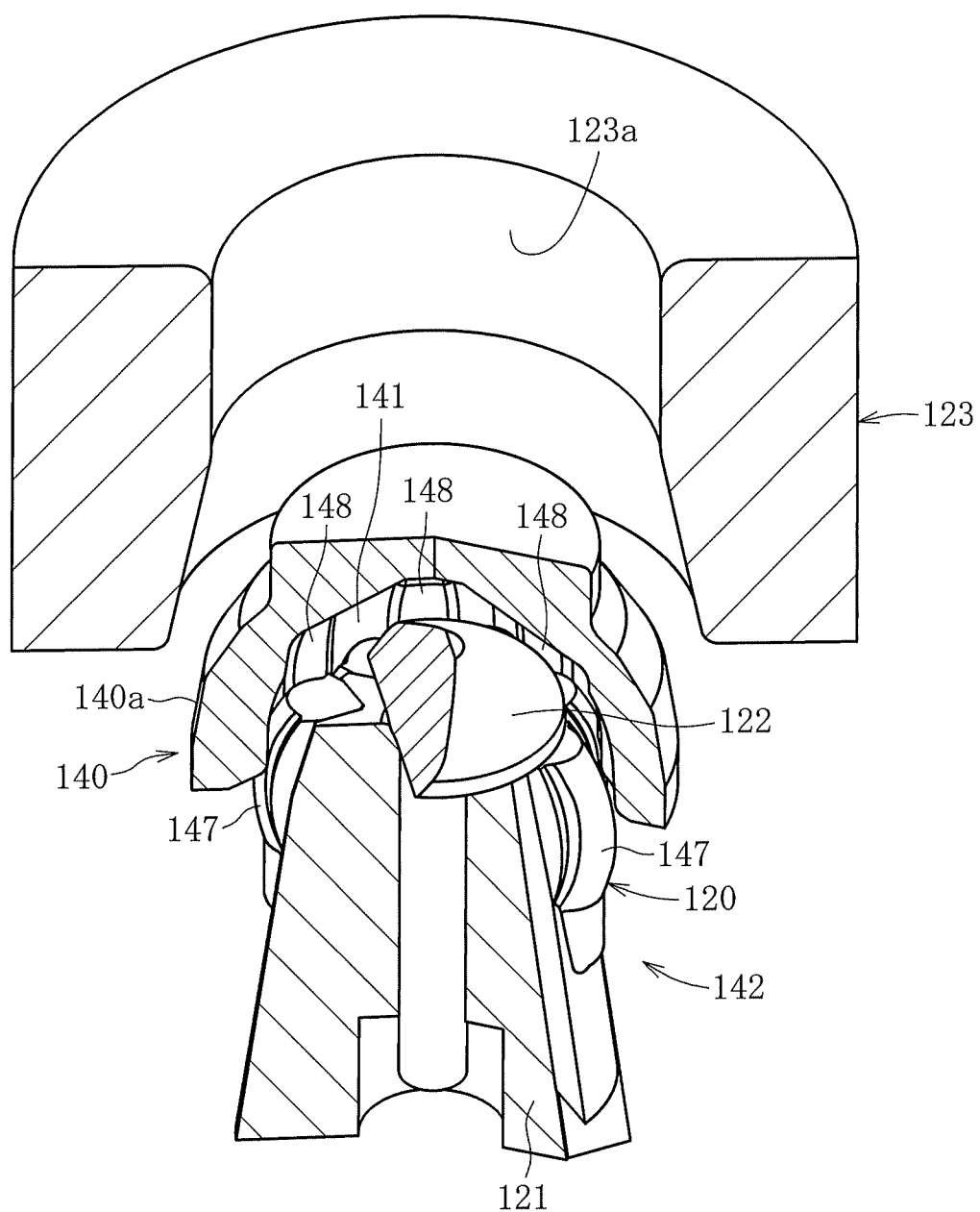
FIG. 30 is a perspective view of a related-art forging apparatus in partial cross section.
Figure 31A:
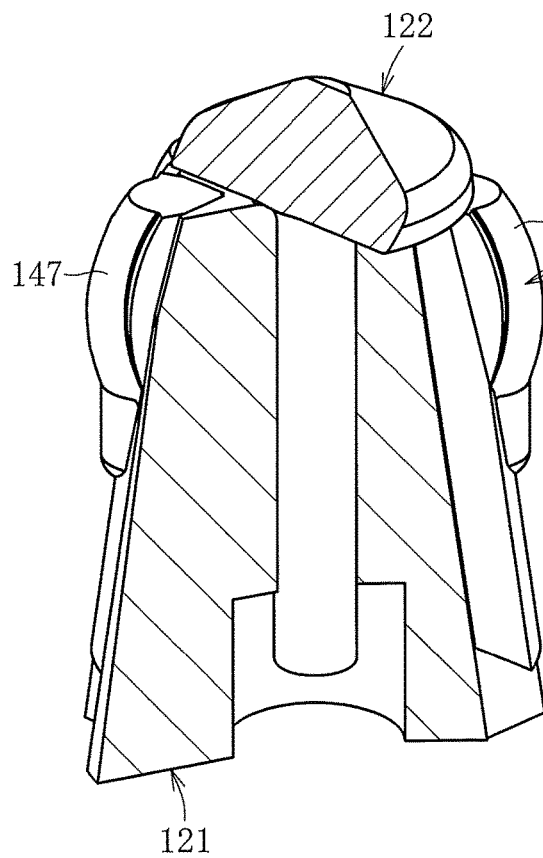
FIG. 31A is an illustration of a punch set of the related-art forging apparatus, and is a perspective view of a radially expanded state in partial cross section.
Figure 31B:
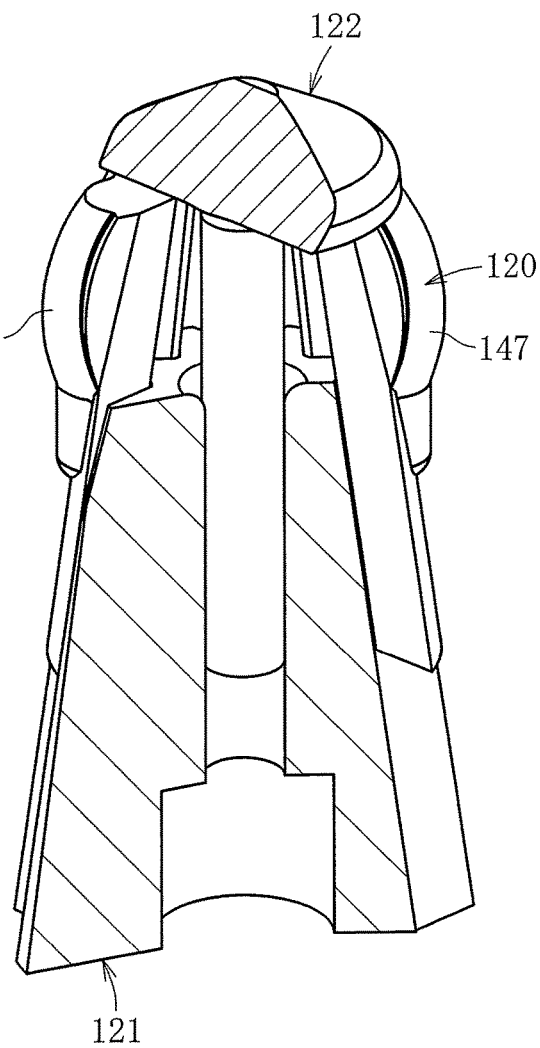
FIG. 31B is an illustration of the punch set of the related-art forging apparatus, and is a perspective view of a radially contracted state in partial cross section.
Figure 32:
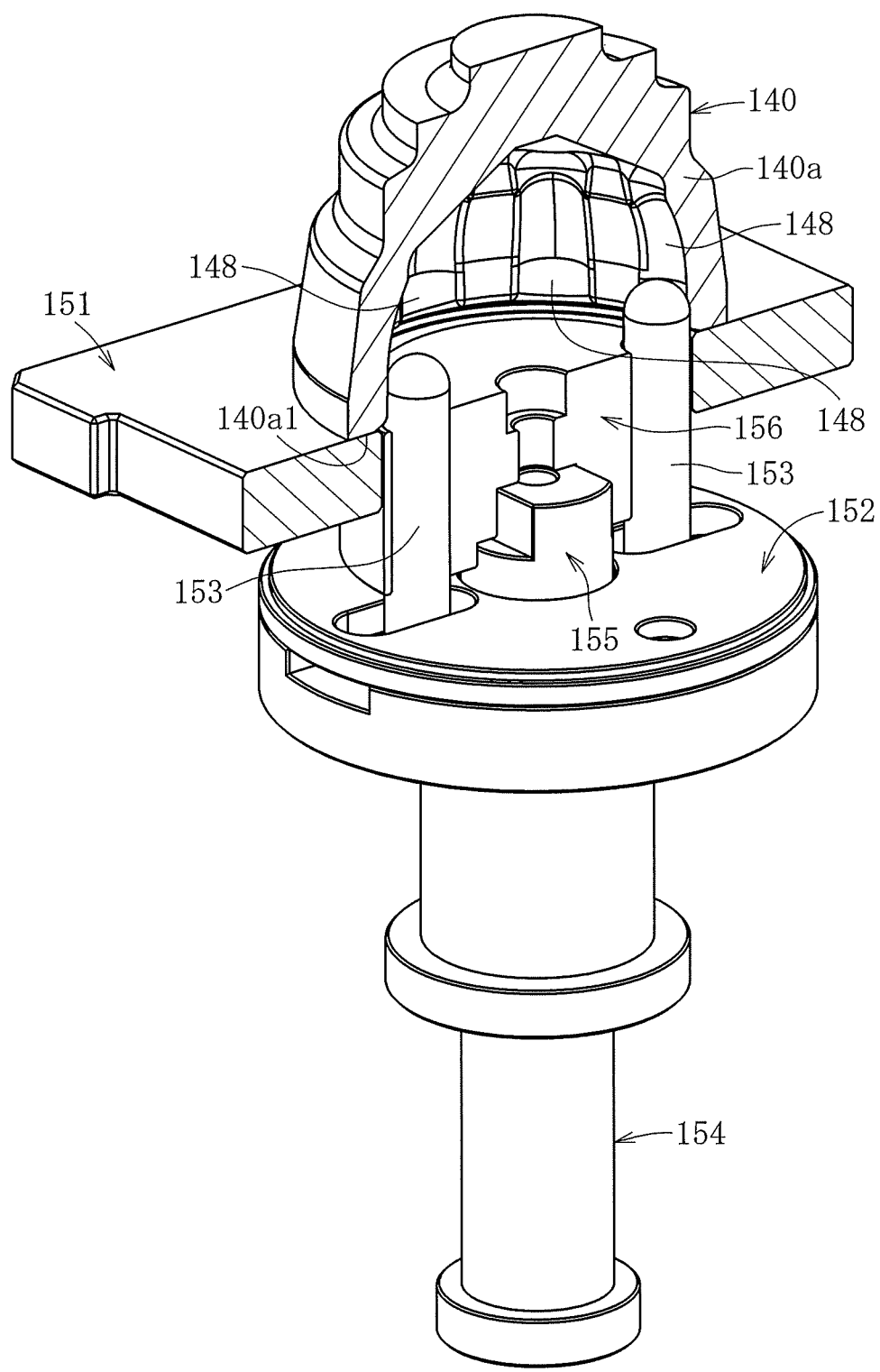
FIG. 32 is a perspective view for illustrating a related-art positioning mechanism.
Figure 33:
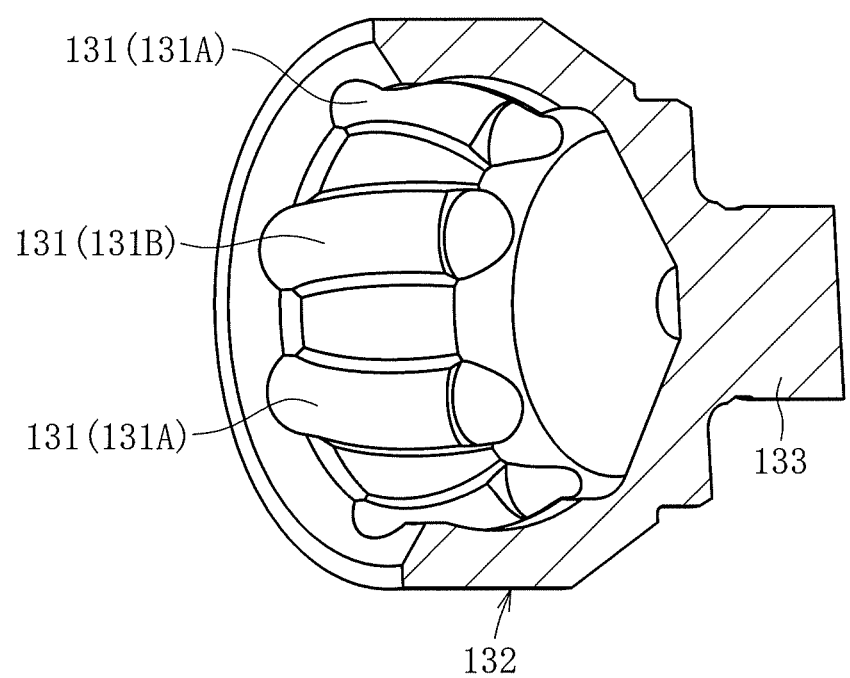
FIG. 33 is a perspective view of an outer joint member in which track grooves each have an arc shape inclined in a circumferential direction, and a diameter of a track groove bottom at a center portion is set larger than a diameter of a track groove bottom on an opening side of a mouth portion in partial cross section.
Figure 34A:
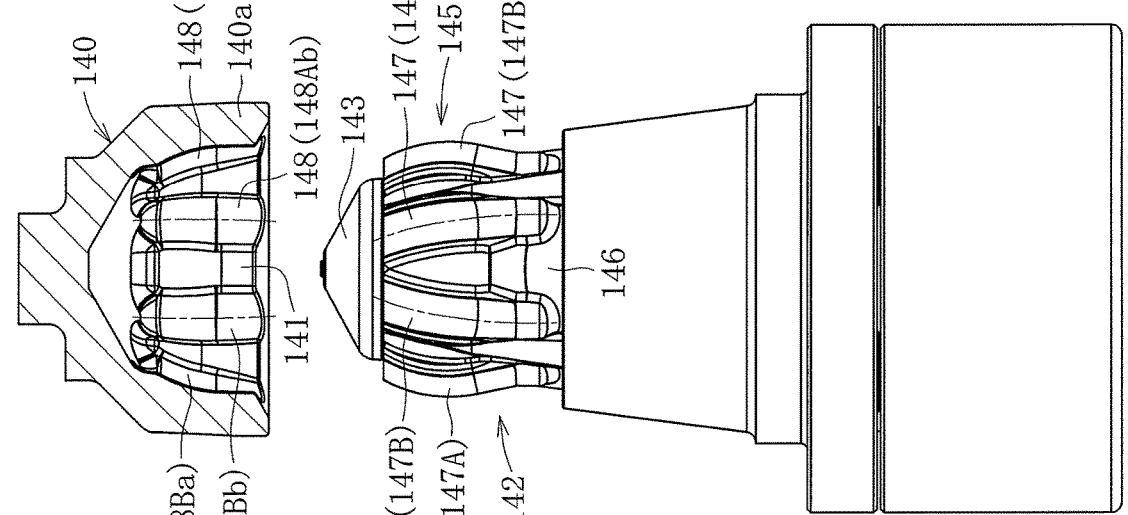
FIG. 34A is an illustration of a relationship between a pre-processing material and the punch set of the forging apparatus, and is an explanatory view for illustrating a state in which phases of grooves of the pre-processing material and phases of track groove portion forming surfaces of the punch set are aligned with each other.
Figure 34B:
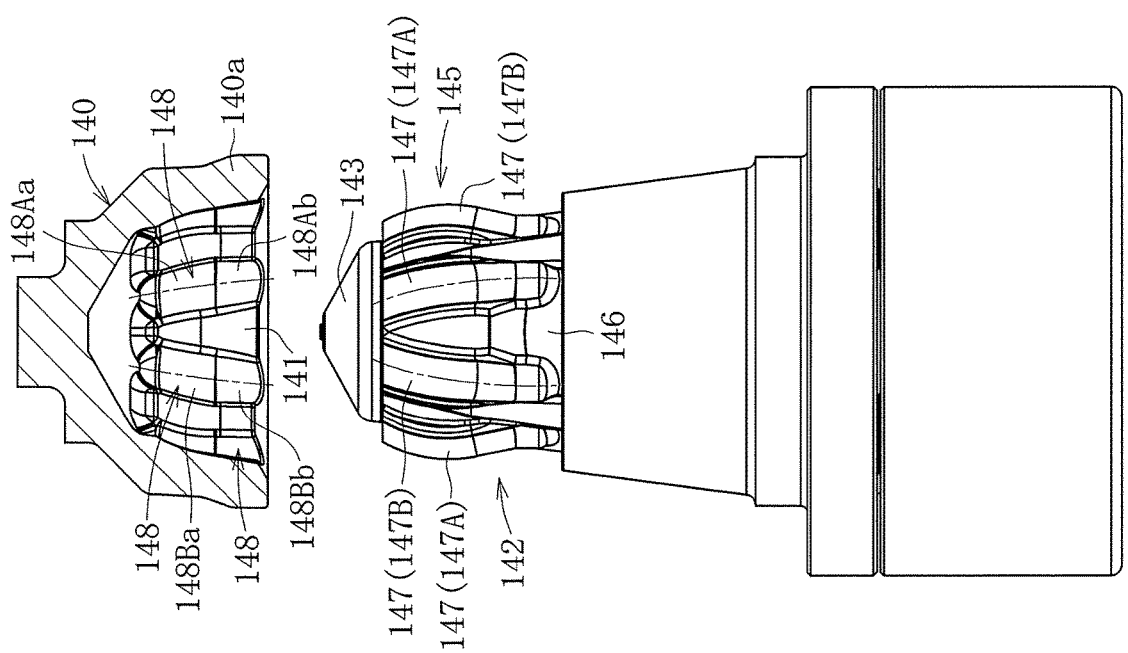
FIG. 34B is an illustration of the relationship between the pre-processing material and the punch set of the forging apparatus, and is an explanatory view for illustrating a state in which the phases of the grooves of the pre-processing material and the phases of the track groove portion forming surfaces of the punch set are not aligned with each other.

After that, as illustrated in FIG. 28C, the pressure is applied to the knockout cylinder 52 so that the punches 20 designed to have a step length larger than the process length of the punch base 21 are further lowered. Then, the positioning tapered stepped portions 44 of the punches 20 are locked to the tapered stopper surfaces 45a of the punch holder 24, and the stepped surfaces 32 of the punches 20 reach the distal end portions of the flange portions 36 of the punch base 21. With this, the gap is formed between each of the stepped surfaces 32 (see FIG. 22A) of the punches 20 and each of the flange surfaces 36a (see FIG. 21B) of the punch base 21 so that the punches 20 are radially contracted and the forged product W2 is removed. The forged product W2 is then subjected to turning, spline processing, heat treatment, grinding, and the like to be processed into the finished product illustrated in FIG. 12.

The forging method according to this embodiment is completed through the above-mentioned processes of FIG. 27A to FIG. 27C and FIG. 28A to FIG. 28C. With the forging method according to this embodiment, in the outer joint member of the constant velocity universal joint, which comprises the track grooves having an arc shape and being inclined in the circumferential direction, the track grooves with high accuracy can be formed while a forging tool can be reduced in cost and be prolonged in life.

Incidentally, this forging apparatus comprises the phase alignment mechanism M2 as illustrated in FIG. 1. The phase alignment mechanism M2 comprises a plate 201, a pair of phase alignment jigs 203 and 203, a pressing member (spring member) 204, and a rotary mechanism M comprising a shaft 205. The plate 201 is configured to support the pre-processing material W1. The pair of phase alignment jigs 203 and 203 are provided upright from a pin holder 202. The pressing member (spring member) 204 is configured to raise the pin holder 202 and the phase alignment jigs 203 and 203 through elastic pressing. The shaft 205 is configured to rotationally drive. Further, the phase alignment jigs 203 and 203 are inserted through a head 206 provided at a distal end portion of the shaft 205. Therefore, the head 206 rotates along with rotation of the shaft 205, and the phase alignment jigs 203 and 203 rotate about an axial center of the shaft. The pressing member (spring member) 204 is suppressed in an urging force thereof by a stopper mechanism (for example, a cylinder mechanism) (not shown).

As described above, in the material W1 in this case, on the inner peripheral surface of the cylindrical portion W1b, the first track groove surfaces 7a' (7Aa' and 7Ba') having a substantially finished shape are formed in the substantially half part on the far side from the joint center O of FIG. 10A. The second track groove surfaces 7b' (7Ab' and 7Bb') having a preliminary shape are formed in the substantially half part on the opening side from the joint center O of FIG. 10A. Further, the first track groove surfaces 7a' (7Aa' and 7Ba') having a substantially finished shape are inclined in the circumferential direction, and each have an arc shape about the joint center O defined as a curvature center. Meanwhile, the second track groove surfaces 7b' (7Ab' and 7Bb') having a preliminary shape each have a linear shape without inclination in the circumferential direction.

Figure 3:
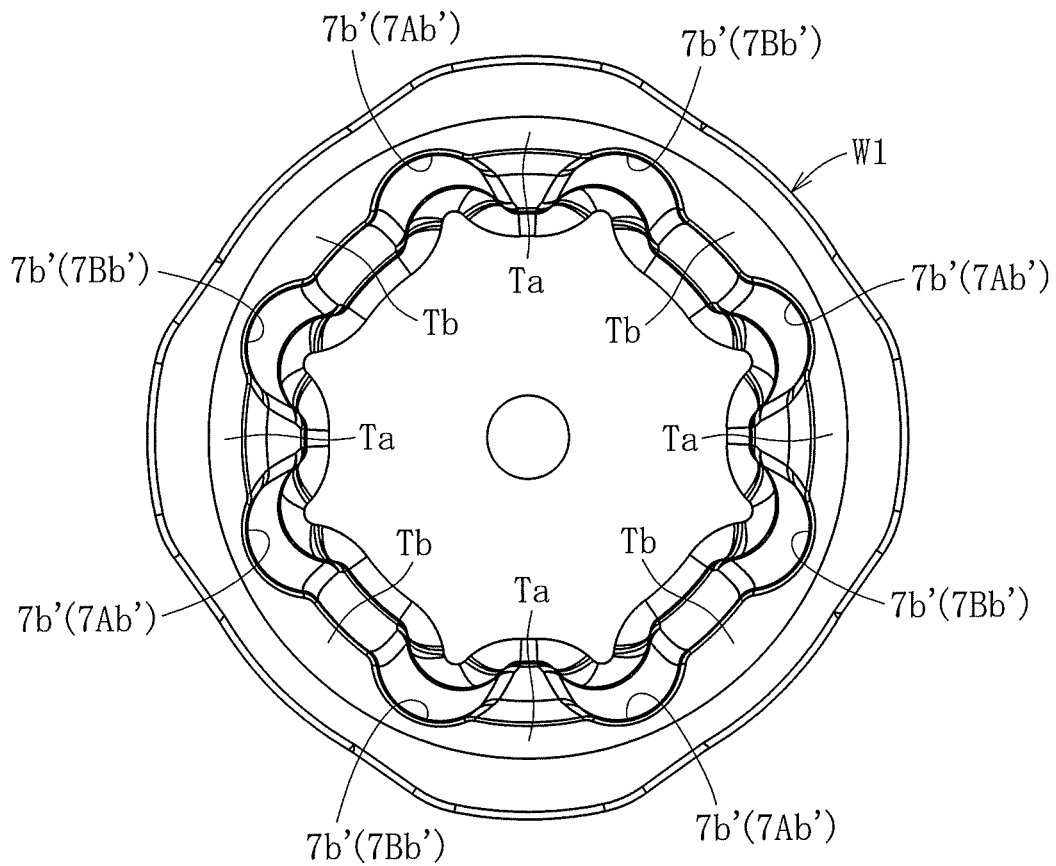
FIG. 3 is an end view of the pre-processing material.
Figure 4:
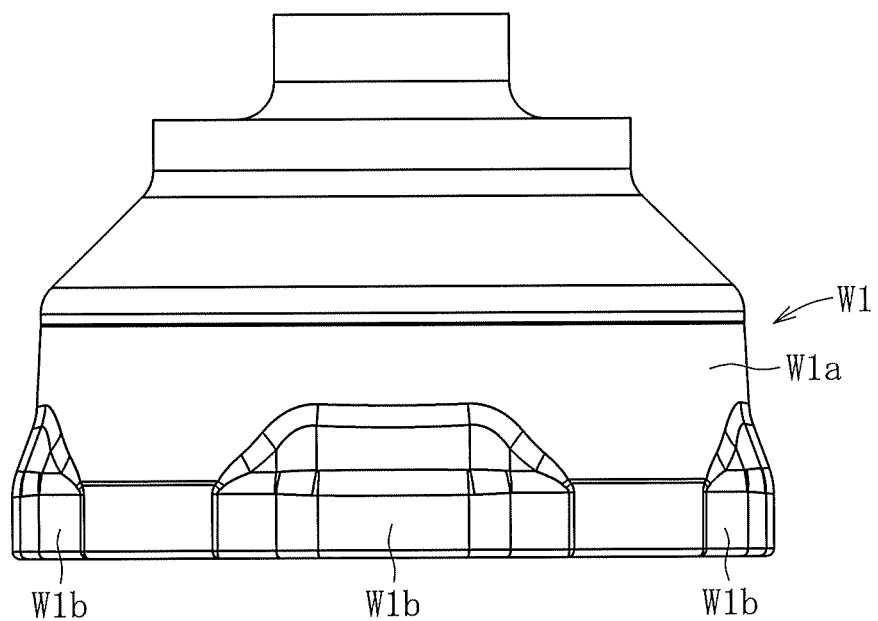
FIG. 4 is a front view of the pre-processing material.

Therefore, openings of the grooves of the pre-processing material W1 (openings of the second track groove surfaces 7b') are arranged at equal pitches along the circumferential direction. As illustrated in FIG. 3, in an inlet portion of the inner peripheral surface of the cylindrical portion W1b, portions each between the track groove surfaces 7Ab' and 7Bb' adjacent in the circumferential direction are thin portions Ta or thick portions Tb, and the thin portions Ta and the thick portions Tb are alternately arranged along the circumferential direction.

Figure 5:
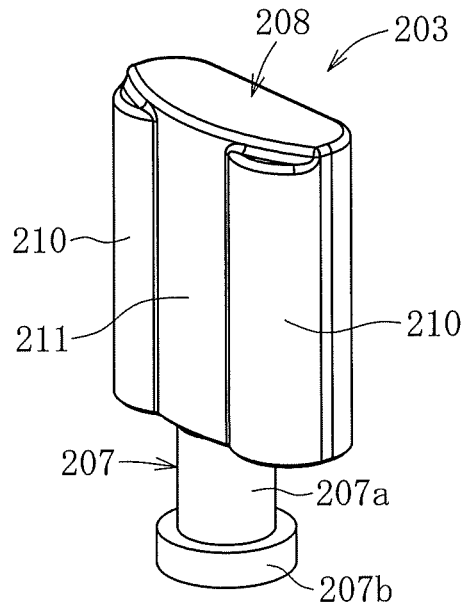
FIG. 5 is a perspective view of a phase alignment jig.

The phase alignment jigs 203 and 203 are arranged in directions opposite to each other at 180° with respect to the axial center of the pin holder 202. As illustrated in FIG. 5, each of the phase alignment jigs 203 comprises a shaft member 207, and a main body portion 208 provided upright from the shaft member 207. The main body portion 208 comprises a flat plate-shaped body having a flat convex curved surface, and convex raised portions formed on end portions on the surface of the flat plate-shaped body. In this case, the convex raised portions correspond to convex portions 210 and 210 to be fitted to the openings of the second track groove surfaces 7Ab' and 7Bb', and the flat plate-shaped body of the main body portion 208 corresponds to a coupling portion 211 configured to couple the convex portions 210 and 210 to each other. The shaft member 207 comprises a shaft main body 207a, and a flange portion 207b provided at a lower end of the shaft main body 207a.

Incidentally, as illustrated in FIG. 1, the pin holder 202 comprises a disc portion 202a, and a shaft portion 202b suspended from a center portion of the disc portion 202a. The disc portion 202a comprises a disc portion main body 215, and a lid member 216 fixed to the disc portion main body 215. In this case, the pin holder 202 can be raised by an elastic force of a pressing member (spring member) 204, but an urging force of the pressing member is suppressed by a stopper mechanism (for example, a cylinder mechanism) (not shown).

The head 206 comprises a head main body 206a formed of a short columnar body, and the head main body 206a has through holes 212 and 212 arranged in directions opposite to each other at 180°. The pair of phase alignment jigs 203 and 203 are fitted into the through holes 212 and 212. Further, the head main body 206a of the head 206 is fitted to a through hole 201a of the plate 201.

Figure 2:
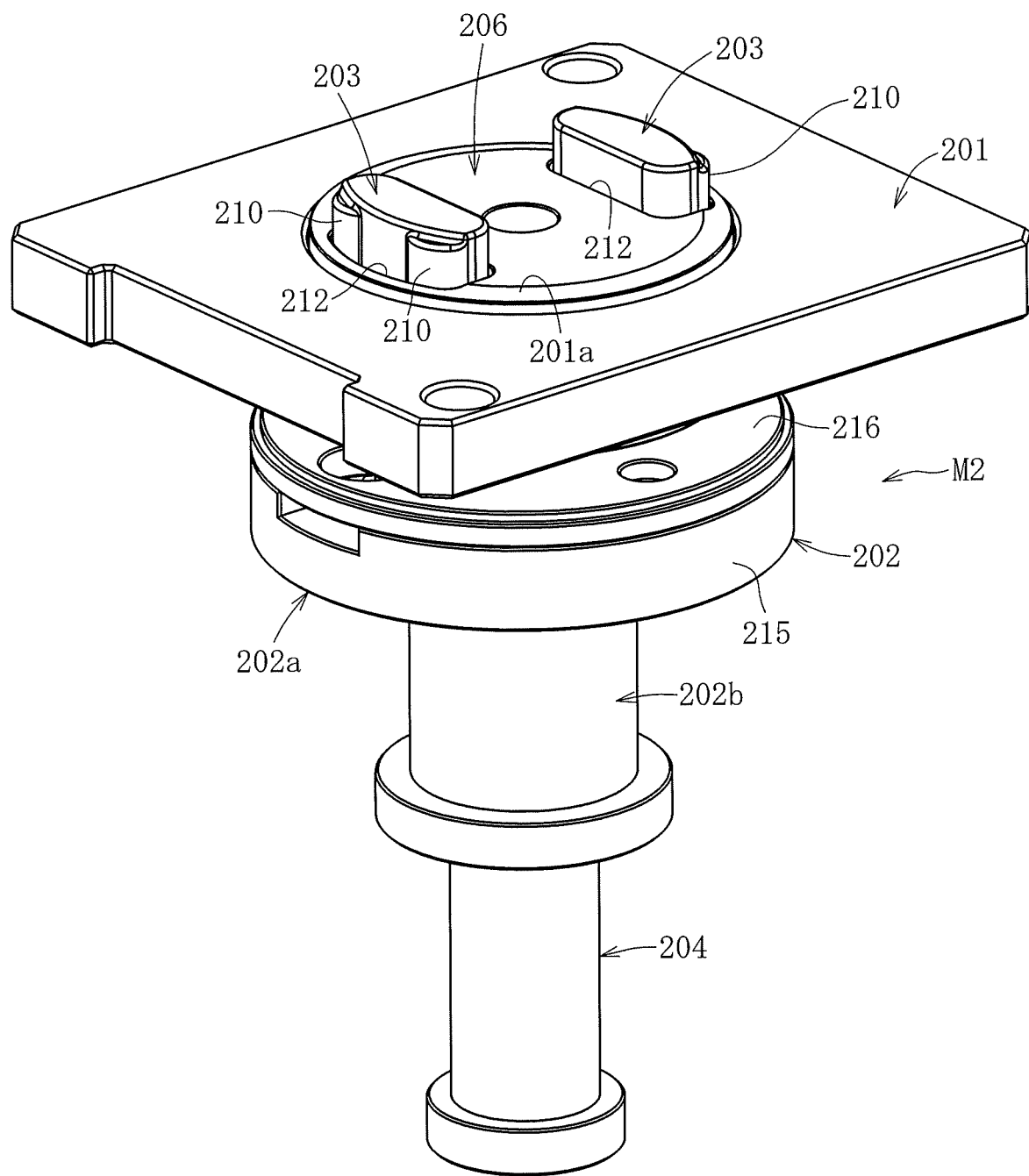
FIG. 2 is a perspective view of a main part of the phase alignment mechanism illustrated in FIG. 1.

Next, a positioning method for the pre-processing material W1 with use of the positioning mechanism M2 illustrated in FIG. 1 and FIG. 2 is described. First, the positioning mechanism M2 is brought into an initial state. The initial state is a state in which the urging force of the pressing member (spring member) 204 is suppressed by the stopper mechanism, and the pair of phase alignment jigs 203 and 203 provided upright from the pin holder 202 are set so that distal ends thereof are located below the upper surface of the head 206.

Then, the pre-processing material W1 is moved and is held at a position concentric with the head 206. In this state, an opening end surface of the cylindrical portion W1b of the pre-processing material W1 is placed on the plate 201. In this state, the urging force of the pressing member (spring member) 204 is released, and the pin holder 202 and the phase alignment pins 153 and 153 are raised.

In this case, when portions each between the grooves adjacent to each other in the circumferential direction, which are to be fitted to the convex portions 210 and 210 of the phase alignment jigs 203 and 203, correspond to the thick portions Tb as illustrated in FIG. 6, each of the phase alignment jigs 203 and 203 cannot be fitted to the opening of the cylindrical portion W1b of the pre-processing material W1. Meanwhile, when portions each between the grooves adjacent to each other in the circumferential direction, which are to be fitted to the convex portions 210 and 210 of the phase alignment jigs 203 and 203, correspond to the thin portions Ta as illustrated in FIG. 7, each of the phase alignment jigs 203 and 203 cannot be fitted to the opening of the cylindrical portion W1b of the pre-processing material W1.

Figure 7:
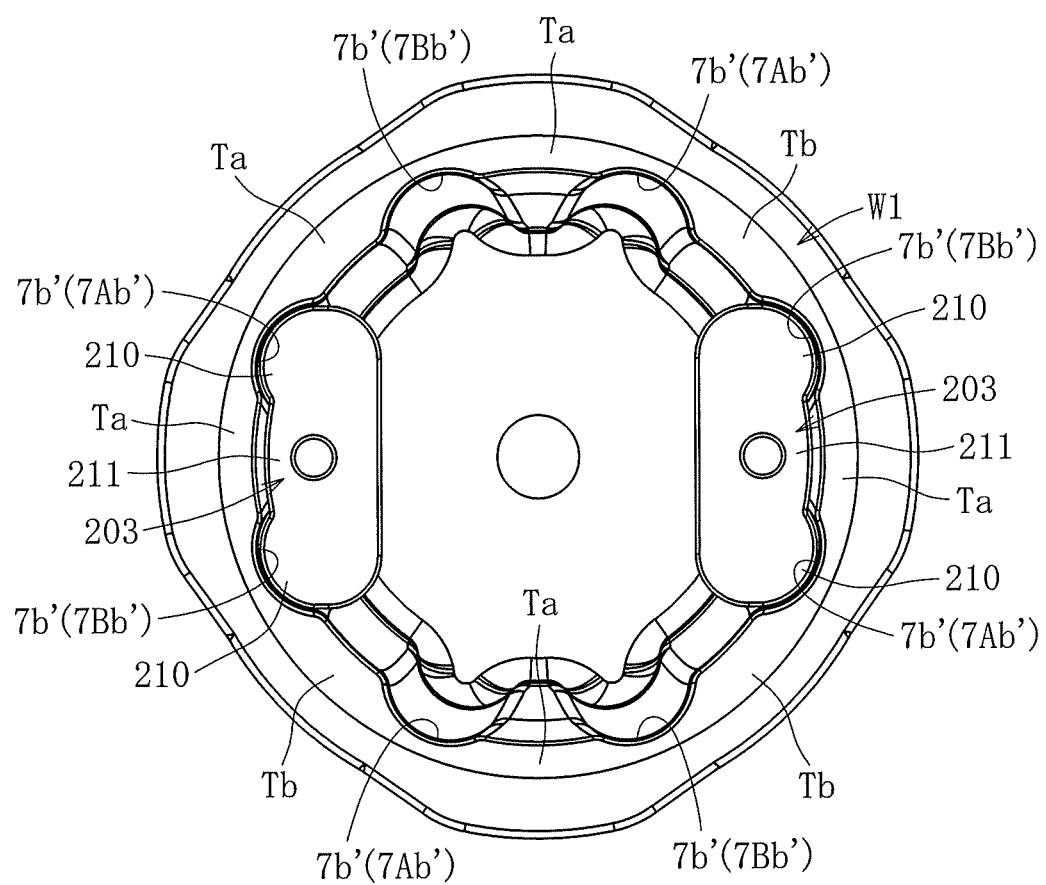
FIG. 7 is an end view of a state in which the phase alignment jigs are fitted to the pre-processing material.

When each of the phase alignment jigs 203 and 203 can be fitted to the opening of the cylindrical portion W1b of the pre-processing material W1 as illustrated in FIG. 7, the convex portions 210 and 210 of the phase alignment jigs 203 and 203 are fitted to the grooves (7Ab' and 7Bb') adjacent to each other in the circumferential direction, and the coupling portions 211 each between the convex portions 210 and 210 are internally fitted to the thin portions Ta. In this state, the pre-processing material W1 is rotated about its axial center through rotation of the shaft 205, and is stopped at a position at which phases of the pre-processing material W1 are aligned with phases of the punches 20. That is, phases of the track grooves 7A' and 7B' of the material are aligned with phases of the track groove portion forming surfaces 27A and 27B of the punches 20.

Further, as illustrated in FIG. 6, when portions adjacent to each other in the circumferential direction, which are to be fitted to the convex portions 210 and 210 of the position alignment jigs 203 and 203, correspond to the thick portions Tb as illustrated in FIG. 6, each of the phase alignment jigs 203 and 203 cannot be fitted to the opening of the cylindrical portion W1b of the pre-processing material W1. Thus, the pre-processing material W1 is rotated about its axial center through rotation of the shaft 205 (see FIG. 1) so that the coupling portions 211 each between the convex portions 210 and 210 are internally fitted to the thin portions Ta. After that, the pre-processing material W1 is rotated about its axial center through rotation of the shaft 205, and is stopped at a position at which the phases of the pre-processing material W1 are aligned with the phases of the punches 20. That is, phases of the grooves 7Ab' and 7Bb' of the pre-processing material W1 are aligned with the phases of the track groove portion forming surfaces 27A and 27B of the punches 20.

Then, under the state in which the phases of the grooves 7Ab' and 7Bb' of the pre-processing material W1 are aligned with the phases of the track groove portion forming surfaces 27A and 27B of the punches 20, the pre-processing material W1 is set to the ironing mechanism M1 by conveying means (for example, an XYZ robot arm or the like) (not shown) while maintaining the state. With this, under the state in which the phases of the grooves 7Ab' and 7Bb' of the pre-processing material W1 and the phases of the track groove portion forming surfaces 27A and 27B of the punches 20 are aligned with each other, the pre-processing material W1 can be set to the ironing mechanism M1. When the pre-processing material W1 can be set to the ironing mechanism M1, the ironing described above can be performed.

FIG. 9A is an illustration of the state in which the phases of the grooves 7Ab' and 7Bb' of the pre-processing material W1 and the phases of the track groove portion forming surfaces 27A and 27B of the punches 20 are aligned with each other. FIG. 9B is an illustration of the state in which the phases of the grooves 7Aa' and 7Ab' of the pre-processing material W1 and the phases of the track groove portion forming surfaces 27A and 27B of the punches 20 are not aligned with each other.

Figure 8:
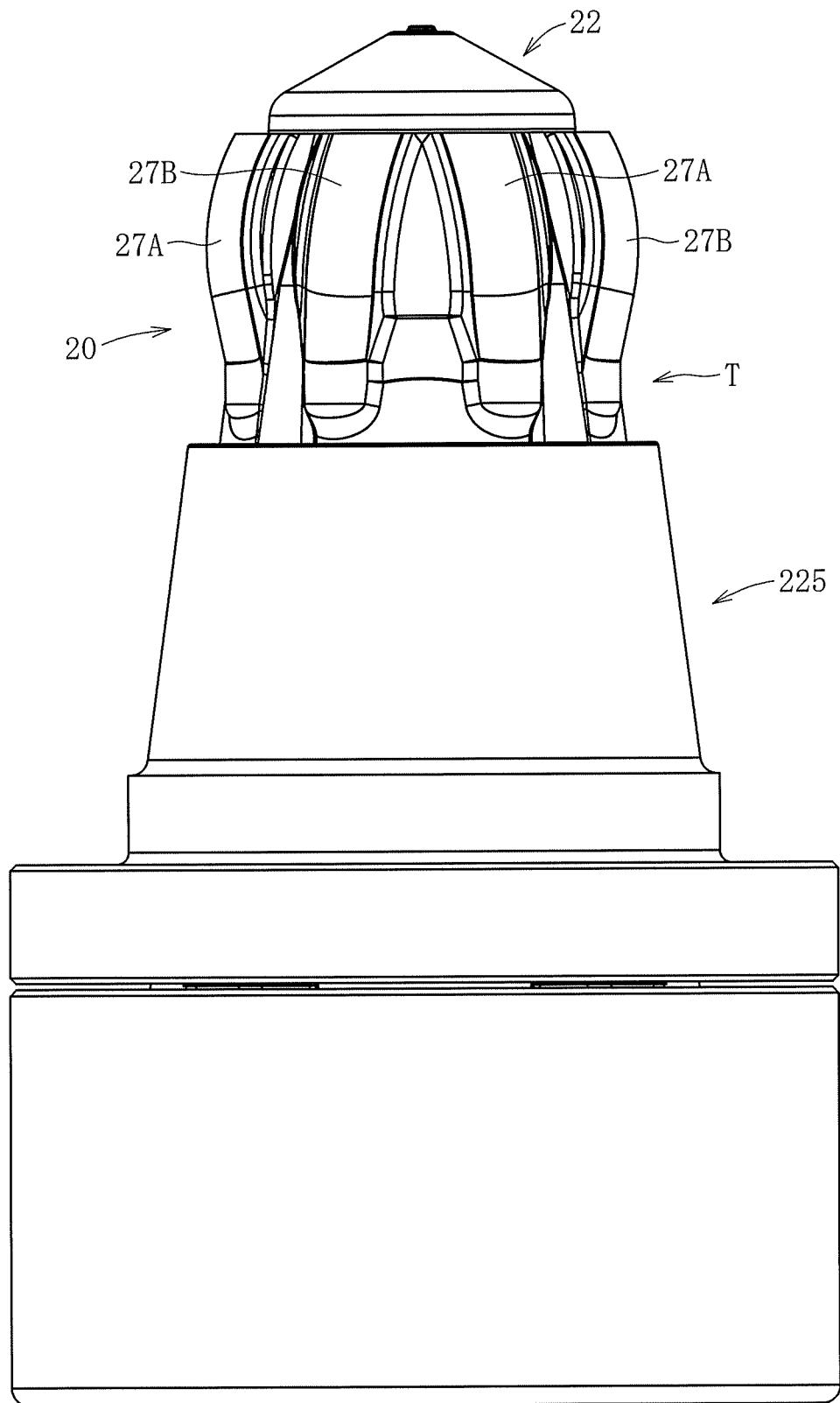
FIG. 8 is a front view for illustrating a punch set of an ironing mechanism.

A part of the punch set T illustrated in FIG. 8 below the track groove portion forming surfaces 27A and 27B of the punches 20 is embedded in abasement 225. Therefore, the punch set T comprises the umbrella punch 22 in addition to the punches 20 and the punch base 21 similarly to that illustrated in FIG. 12 to FIG. 17. Therefore, as illustrated in FIG. 26, ironing can be performed with use of the punches 20 and the die 23. Therefore, the punch set T does not comprise the basement 225.

As described above, the phase alignment mechanism M2 comprises the position alignment jigs 203 and 203 each comprising the pair of convex portions 210 and 210, which are to be fitted to the two grooves of the pre-processing material which are adjacent to each other in the circumferential direction under the state in which the phases of the grooves 7Ab' and 7Bb' in the inner peripheral surface of the pre-processing material W1 and the phases of the track groove portion forming surfaces 27A and 28B of the punches 20 are aligned with each other, and are restricted from being fitted thereto under the state in which those phases are not aligned with each other.

With the forging apparatus for an outer joint member of a constant velocity universal joint according to the present invention, before the pre-processing material W1 is fitted to the punch 20, the phases of the grooves 7Ab' and 7Bb' in the inner peripheral surface of the pre-processing material W1 and the phases of the track groove portion forming surfaces 27A and 27B of the punch 20 can be aligned with each other by the phase alignment mechanism M2. Thus, in the ironing mechanism M1, under the state in which the phases of the grooves 7Ab' and 7Bb' of the pre-processing material W1 and the phases of the track groove portion forming surfaces 27A and 27B of the punch set are aligned with each other, the punch 20 can be press-fitted into the cylindrical portion W1b. Accordingly, forming failure, die breakage, and the like can be prevented. Further, the ironing mechanism M1 comprises the punch 20 that is fitted into the cylindrical portion W1b of the pre-processing material W1 and is radially expandable and contractible, and the die 23 having the hole 23a into which the cylindrical portion W1b is fitted. Accordingly, an existing ironing mechanism (forging apparatus) M1 can be used as it is. Therefore, cost reduction can be attained.

Although the embodiment of the present invention has been described above, the present invention is not limited to the embodiment described above, and various modifications may be made thereto. The number of positioning jigs 203 and 203 is not limited to two and it is only required to provide at least one positioning jig 203. Further, as the outer joint member, in the embodiment, the number of track grooves is eight, and the number of balls serving as torque transmission members of the constant velocity universal joint is eight, but may be six or ten or more.

As the position alignment mechanism M2, in the embodiment described above, the inner diameter (portion excluding the grooves 7Ab' and 7Bb') of the inner peripheral surface of the cylindrical portion W1b of the pre-processing material W1 comprises a large-diameter portion and a small-diameter portion, and the pre-processing material W1 has such a shape that the positioning jigs 203 can be inserted when the positioning jigs 203 correspond to the large-diameter portion, and cannot be inserted when the positioning jigs 203 correspond to the small-diameter portion. However, the present invention is not limited thereto. That is, a convex and concave fitting structure may be employed. In this case, convex portions may be provided on the pre-processing material W1 side, and concave portions may be provided on the positioning jig 203 side. Conversely, concave portions may be provided on the pre-processing material W1 side, and convex portions may be provided on the positioning jig 203 side.

INDUSTRIAL APPLICABILITY

As the constant velocity universal joint, there is provided the fixed type constant velocity universal joint in which the balls are used as the torque transmission members. The track grooves each have an arc shape that is inclined in the circumferential direction. It is possible to form the outer joint member in which the diameter of the track groove bottom at the center portion is set larger than the diameter of the track groove bottom on the opening side.

REFERENCE SIGNS LIST 1 constant velocity universal joint
2 outer joint member
3 inner joint member
4 ball
5 cage
6 spherical inner peripheral surface
7 track groove
7a' first track groove surface having substantially finished shape
7b' second track groove surface having preliminary shape
8 spherical outer peripheral surface
9 track groove
12 spherical outer peripheral surface
13 spherical inner peripheral surface
20 punch
21 punch base
22 umbrella punch
23 die
23a die hole
24 punch holder
27A, 27B track groove forming surface
27Aa, 27Ba first track groove portion forming surface
27Ab, 27Bb second track groove portion forming surface
203 phase alignment jig
M1 ironing mechanism
M2 phase alignment mechanism
M rotary mechanism
T punch set
Ta thin portion
Tb thick portion
W1 pre-processing material
W1a protruding portion
W1b cylindrical portion

The invention claimed is:
1. A forging method for an outer joint member of a constant velocity universal joint,
the constant velocity universal joint comprising:
an outer joint member having a spherical inner peripheral surface in which a plurality of track grooves are formed;
an inner joint member having a spherical outer peripheral surface in which a plurality of track grooves are formed so as to be paired with the track grooves of the outer joint member;
a plurality of balls, which are interposed between the track grooves of the outer joint member and the track grooves of the inner joint member, and are configured to transmit torque; and
a cage, which is interposed between the spherical inner peripheral surface of the outer joint member and the spherical outer peripheral surface of the inner joint member, and is configured to hold the balls,
the track grooves of the outer joint member and the track grooves of the inner joint member each having an arc-shaped ball raceway center line having a curvature center that is prevented from being offset in an axial direction with respect to a joint center,
a plane including the ball raceway center line and the joint center being inclined in a circumferential direction with respect to a joint axial line,
each of the track grooves of the outer joint member and each of the track grooves of the inner joint member, which are paired with each other, being inclined in mutually opposite directions,
the forging method comprising:
aligning, before a pre-processing material is fitted into a punch set, phases of grooves formed in an inner peripheral surface of a cylindrical portion of the pre-processing material and phases of track groove portion forming surfaces of the punch set with each other with use of a phase alignment mechanism; and
performing ironing by fitting the punch set that is radially expandable and contractible into the cylindrical portion of the pre-processing material of the outer joint member comprising the cylindrical portion under a state in which the phases are aligned with each other, and press-fitting the cylindrical portion into a hole of a die, and
the phase alignment mechanism comprising a phase alignment jig comprising a pair of convex portions, which are to be fitted into two grooves of the pre-processing material which are adjacent to each other in the circumferential direction under a state in which the phases of the grooves in the inner peripheral surface of the pre-processing material and the phases of the track groove portion forming surfaces of the punch set are aligned with each other, and are restricted from being fitted thereto under a state in which the phases of the grooves in the inner peripheral surface of the pre-processing material and the phases of the track groove portion forming surfaces of the punch set are not aligned with each other.

2. The forging method for an outer joint member of a constant velocity universal joint according to claim 1,
wherein the inner peripheral surface of the cylindrical portion of the pre-processing material has:
an arc-shaped track groove surface having a shape and being formed in a part in an axial direction on a far side so as to be inclined in the circumferential direction; and
a linear track groove surface having a preliminary shape and being formed in a substantially half part in the axial direction on an opening side so as to be prevented from being inclined in the circumferential direction,
wherein, in an inlet portion of the inner peripheral surface of the cylindrical portion, portions of the pre-processing material each between the grooves adjacent to each other in the circumferential direction are thin portions or thick portions, and the thin portions and the thick portions are alternately arranged along the circumferential direction, and wherein the phase alignment mechanism comprises a phase alignment jig comprising:
- a pair of convex portions to be fitted along the axial direction to the grooves of the pre-processing material which are adjacent to each other in the circumferential direction; and
- a coupling portion, which is formed between the convex portions, is allowed to be internally fitted to corresponding one of the thin portions of the pre-processing material along the axial direction, and is prevented from being internally fitted to corresponding one of the thick portions of the pre-processing material along the axial direction.

3. The forging method for an outer joint member of a constant velocity universal joint according to claim 1, wherein, under a state in which the pair of convex portions of the phase alignment jig are fitted to a pair of grooves of the pre-processing material, and a radially outer surface of the phase alignment jig is internally fitted to the corresponding one of the thick portions, the pre-processing material is stopped at a predetermined phase position through rotation of the phase alignment jig, and ironing with the punch set and the die is performed.

4. The forging method for an outer joint member of a constant velocity universal joint according to claim 1, wherein, in the ironing, the cylindrical portion of the pre-processing material is press-fitted into the hole of the die from an opening portion side of the cylindrical portion.

5. The forging method for an outer joint member of a constant velocity universal joint according to claim 2, wherein, under a state in which the pair of convex portions of the phase alignment jig are fitted to a pair of grooves of the pre-processing material, and a radially outer surface of the phase alignment jig is internally fitted to the corresponding one of the thick portions, the pre-processing material is stopped at a predetermined phase position through rotation of the phase alignment jig, and ironing with the punch set and the die is performed.

6. The forging method for an outer joint member of a constant velocity universal joint according to claim 2, wherein, in the ironing, the cylindrical portion of the pre-processing material is press-fitted into the hole of the die from an opening portion side of the cylindrical portion.

7. The forging method for an outer joint member of a constant velocity universal joint according to claim 3, wherein, in the ironing, the cylindrical portion of the pre-processing material is press-fitted into the hole of the die from an opening portion side of the cylindrical portion.

* * * * *